United States Patent [19]

Arakawa et al.

[11] Patent Number: 5,617,319
[45] Date of Patent: Apr. 1, 1997

[54] NAVIGATION APPARATUS WITH ENHANCED POSITIONAL DISPLAY FUNCTION

[75] Inventors: Takeharu Arakawa; Morio Araki; Kenichi Nobe; Kiyoshi Yamanaka, all of Kawagoe, Japan

[73] Assignee: Pioneer Electronic Corporation, Tokyo, Japan

[21] Appl. No.: 447,882

[22] Filed: May 23, 1995

Related U.S. Application Data

[63] Continuation of Ser. No. 16,292, Feb. 11, 1993, abandoned.

[30] Foreign Application Priority Data

| | | | |
|---|---|---|---|
| Feb. 18, 1992 | [JP] | Japan | 4-031046 |
| Mar. 30, 1992 | [JP] | Japan | 4-074032 |
| Mar. 30, 1992 | [JP] | Japan | 4-074033 |

[51] Int. Cl.⁶ .................. G06F 17/00; G08G 1/137
[52] U.S. Cl. ............ 364/449.1; 340/990; 340/995
[58] Field of Search ................ 364/444, 449, 364/451, 460, 462; 340/990, 995

[56] References Cited

U.S. PATENT DOCUMENTS

| | | | |
|---|---|---|---|
| 4,677,450 | 6/1987 | Ito et al. | 364/449 |
| 4,779,138 | 10/1988 | Nonura et al. | 358/236 |
| 4,812,980 | 3/1989 | Yamada et al. | 364/449 |
| 4,827,420 | 5/1989 | Musa | 364/449 |
| 4,862,374 | 8/1989 | Ziemann | 364/449 |
| 4,890,104 | 12/1989 | Takanabe et al. | 340/995 |
| 4,951,212 | 8/1990 | Kurihara et al. | 369/449 |
| 4,954,959 | 9/1990 | Moroto et al. | 364/449 |
| 4,989,151 | 1/1991 | Nuimura | 364/449 |
| 4,992,947 | 2/1991 | Nimura et al. | 364/444 |
| 5,117,363 | 5/1992 | Akiyama et al. | 364/449 |
| 5,124,924 | 6/1992 | Fukushima et al. | 364/449 |
| 5,161,242 | 11/1992 | Boulay | 364/455 |
| 5,179,385 | 1/1993 | O'Loughlin et al. | 342/176 |
| 5,396,254 | 3/1995 | Toshiyuki | 342/357 |
| 5,424,951 | 6/1995 | Nobe et al. | 364/443 |

FOREIGN PATENT DOCUMENTS

| | | |
|---|---|---|
| 0119674 | 9/1984 | European Pat. Off. . |
| 0452613 | 2/1993 | European Pat. Off. . |
| 4033829 | 4/1991 | Germany . |
| 2048604 | 12/1980 | United Kingdom . |

*Primary Examiner*—Kevin J. Teska
*Assistant Examiner*—Tan Nguyen
*Attorney, Agent, or Firm*—Sughrue, Mion, Zinn, Macpeak & Seas

[57] ABSTRACT

A navigation apparatus including a position detector for detecting an vehicle's position and outputting vehicle's position data, a memory for storing map data, a display unit for displaying a variety of information, and a display controller for displaying a map on the display unit based on the map data and superimposing the vehicle's position on the map displayed on the display unit based on the vehicle's position data. The apparatus further includes a commander for specifying an arbitrary position on the map displayed on the display unit; a coordinate calculator for calculating the latitude and longitude as the coordinates of the actual location corresponding to the specified position on the map and outputting the same as coordinate data; and a coordinate display controller for superimposing the coordinates of the actual location in numerical values on the displayed map based on the coordinate data.

2 Claims, 30 Drawing Sheets

NAVIGATION APPARATUS WITH ENHANCED POSITIONAL DISPLAY FUNCTION

This is a continuation of application Ser. No. 08/016,292 filed Feb. 11, 1993 now abandoned.

BACKGROUND OF THE INVENTION

1. Field of the Invention

The present invention relates to a navigation apparatus for a mobile body, and more particularly to display processing for a navigation apparatus which is mounted in a vehicle. The present invention also relates to a map display apparatus, and more particularly to a map display apparatus suitable for use in a navigation system for a mobile body.

2. Description of Background Information

Conventional stand-alone navigation apparatuses, such as a position detecting apparatus for a variety of mobile bodies such as automotive vehicles, aircraft, ships, and so on, have been known in the art. The stand-alone navigation system is structured to derive a two-dimensional displacement (a vector amount) of a mobile body from azimuthal data from an azimuth sensor and velocity data from a velocity sensor, and detect a current position of the mobile body by accumulating this two-dimensional displacement to a reference point. For example, when applied to a vehicle, an accumulated traveled distance derived from a traveled distance sensor and an accumulated azimuth derived from an azimuthal sensor are accumulated on a reference point, to determine a current position (data). More specifically, for example, a correspondence between a rotational speed of a driving shaft and a number of pulses generated by a rotational speed sensor mounted on the driving shaft is previously established. An accumulated traveled distance is derived by multiplying a distance calculated from a total number of pulses generated from the reference point to the current position with a distance correcting coefficient, and an accumulated azimuth is then derived by accumulating the azimuth detected by a geomagnetic sensor.

In addition, a GPS (Global Positioning System) navigation apparatus has been developed as a position detecting apparatus utilizing artificial satellites. This GPS navigation apparatus receives radio wave signals generally from three or more GPS satellites, and virtual distance data including a time offset of the receiver between each GPS satellite and a received point (vehicle's position) and positional data of each GPS satellite are used to detect a current position (data) of the received point.

These position detecting apparatus have been implemented as actual navigation apparatus ranging from a simple system which indicates the latitude and longitude of a current position with numerical values to a high-level system which displays a variety of data including an vehicle's position, a distance to a destination, a moving speed and so on a map displayed on the screen of a CRT (Cathode Ray Tube) unit.

A navigation system which displays a variety of data on a CRT screen reads map data including a derived current position from a storage medium such as CD-ROM, creates screen data from the read map data and detected current position data, and outputs the created data to the CRT unit for displaying a map thereon. This display screen allows a user to know his or her current position in relation to the map. Further, the above-mentioned conventional navigation apparatuses include such an apparatus which displays the latitude and longitude of the position of a mobile body on a CRT screen with numerical values.

The above-mentioned conventional navigation apparatus, however, has a disadvantage in that it is not capable of calculating coordinate data (latitude and longitude) of an arbitrary position on a map displayed on the CRT unit. For example, when a common destination is to be set in a plurality of navigation apparatuses existing at remote positions from one another, it is difficult to correctly communicate the destination to correspondents particularly in an unknown region. A like problem may also arises among navigation apparatuses, each is arranged to display the coordinates of their vehicle's positions with numerical values, where even though each apparatus can communicate with another about the coordinates of a current vehicle's position, it is difficult to immediately understand the relative positional relationship between these apparatuses.

FIG. 1 shows an example of a conventional display for navigation on the screen. The display on the screen includes a map MP in which indicated are the positions of buildings or the like which may serve as guides (represented by "." in the drawing), their names (indicated by ABC, DEF in the drawing) and so on. On the upper left side of the map MP, there is displayed a distance scale DS for this map. In a central portion of the screen, there are displayed the current vehicle's position (indicated by a triangular mark) P and a range scale DSC from the current vehicle's position. If the coordinates of a destination (for example, the latitude and longitude) have previously been input, the azimuth x from the current position (indicated by an arrow in the drawing) and the straight distance LD from the current position are also displayed on the map MT as destination information.

In the conventional navigation system as described above, since the destination information displayed on the CRT screen only provides the azimuth and straight distance from the current position (vehicle's position) to the destination, when a user has set several locations on the way to the final destination (such a location will hereinafter be referred to as a "route point") as intermediate destinations, the user may sometimes forget which are such intermediate destinations, thereby causing to the user anxiety about the destination to which he or she is running.

Incidentally, the user sometimes desires to refer to a map around a particular destination. For example, when the user is going to a ΔΔ building near OO station, he or she will refer to a map around the OO station. The conventional navigation system has a mode which displays a name list of locations to be displayed to allow the user to select a location from the list, and display a map around the selected location (this mode will hereinafter be referred to as "the atlas mode").

The operation of the navigation system in the atlas mode will be explained below with reference to FIGS. 2–8. It is assumed herein that stored data on a name list is classified according to the category of locations to be displayed. More specifically, location data may be classified into the following four categories: 1. location name list data which has been stored as initial data in the navigation system and includes names of stations, crossovers and so on and the latitude and longitude thereof; 2. user registered location data which is personal location data previously stored in the navigation system such as the user's private residence, office and so on; 3. destination data which is location data on the final destination set by the user; and 4. route point data which is location data on intermediate destinations which are manually set by the user or automatically retrieved by the navigation system and are to be passed through for reaching the final destination.

Prior to the explanation of the operation, a data storing format of the name list will be explained below.

The location name list data, the user registered location data, the destination data and the route point data are previously stored in a memory, not shown, as packet data. Respective packed data groups $DP_1$, $DP_2$, $DP_3$, $DP_4$ of the location name list data, the user registered location data, the destination data and the route point data are sequentially stored from previously determined storage start addresses thereof $L_0$, $T_0$, $M_0$, $K_0$, as shown in FIG. 2. Numbers of packets constituting the respective packet data groups $DP_1$, $DP_2$, $DP_3$, $DP_4$ are stored in a predetermined storage area of the memory, not shown, as the number of location name list packets NL; the number of user registered location packets NT; the number of destination packet numbers NM (=1); and the number of route point packets NK, as shown in FIG. 3(a). Also, each packet data constituting each of the packet data groups comprises latitude numerical value data $D_{LA}$ indicative of the latitude of a particular location; longitude numerical value data $D_{LO}$ indicative of the longitude of the particular location; and chinese character code data $D_{CH}$ of a name character string, as shown in FIG. 3(b).

Now, the operation of the atlas mode will be explained below. A screen on the display unit in the atlas mode is divided into a mode display area MAR for displaying an operation mode corresponding to a display on the screen and instructions to prompt the user to input; first to fifth item display areas $IAR_0$–$IAR_4$ for displaying items to be selected; and a manipulation instruction area HAR for displaying a variety of manipulation instructions, as shown in FIG. 4. The first to fifth item display areas $IAR_0$–$IAR_4$ correspond to selected frame numbers Col=0–4, respectively.

First, when the user selects the atlas mode, an atlas mode initial screen $FL_1$ as shown in FIG. 5 is displayed on the display unit. Then, the navigation system asks the user from which of the location name list data, the user registered location data, the final destination data and the route point data a location to be displayed is selected. The user then manipulates cursor keys to point a cursor on a desired data category and depresses a determination key, not shown, to select the data category. More specifically, in FIG. 5, since the frame of the currently selected data category (the frame of the user registered location data) is reversely displayed (represented by hatching in the drawing), depression of the determination key, not shown, in this state results in displaying a screen $FL_3$ for selecting user registered location data as shown in FIG. 6.

Next, the above described operation will be explained in greater detail with reference to operation flowcharts of FIGS. 7 and 8.

When the user selects the atlas mode, the atlas mode initial screen (see FIG. 5) is displayed. If the user has selected the location name list data on the atlas mode initial screen, which is determined by step S51, the flow proceeds to step S55, where a data storage start address Top is set to $L_0$, and a data storage end address Tail is set to NL-1, followed by the flow proceeding to step S60. On the other hand, if the location name list data has not been selected at step S51, the flow proceeds to step S52.

If it is determined at step S52 that the user registered location data has been selected on the atlas mode initial screen, the flow proceeds to step S56, where the data storage start address Top is set to $M_0$, and the data storage end address Tail is set to NT-1. Then, the flow proceeds to step S60. Contrarily, if the user registered location data has not been selected at step S52, the flow proceeds to step S53.

If it is determined at step S53 that the destination data has been selected on the atlas mode initial screen, the flow proceeds to step S57. where the data storage start address Top is set to $M_0$, and the data storage end address Tail is set to NM-1. The flow then proceeds to step S60. Contrarily, if the destination data has not been selected at step S53, the flow proceeds to step S54.

If it is determined at step S54 that the route point data has been selected on the atlas mode initial screen, the flow proceeds to step S58, where the data storage start address Top is set to $K_0$, and the data storage end address Tail is set to NK-1. The operation then proceeds to step S60.

Referring next to FIG. 8, a start packet number Ptr is set to the data storage start address Top, and a selected frame number Col is set to zero (step 60).

Then, if it is determined, at step S62, that an upward moving key (↑) has been depressed, the flow proceeds to step S71, where it is determined whether or not the selected frame number Col is equal to zero (Col=0). If the selected frame number Col is not equal to zero (Col≠0), Col is decremented by one at step S72 (Col=Col−1), and thereafter the flow returns to step S61. If the selected frame number Col is equal to zero (Col=0), it is determined at step S73 whether or not the start packet number Ptr is larger than the data storage start address Top. If Ptr>Top, Ptr is decremented by one at step S74 (Ptr=Ptr−1), and the flow returns to step S61. Conversely, if Ptr≦Top, the flow immediately returns to step S61.

At step S62, if the upward moving key is not depressed, the flow proceeds to step S63 to determine whether or not a downward moving key (↓) has been depressed. If so, the flow proceeds to step S67. At step S67, it is determined whether or not the selected frame number Col is equal to four (Col=4). If the selected frame number Col is not zero (Col≠0), Col is incremented by one (Col=Col+1) at step S68, and then the flow again returns to step S61.

If the selected frame number Col is equal to four (Col=4), it is determined at step S69 whether or not the start packet number Ptr plus four is larger than the data storage end address Tail (Ptr=4>Tail). If Ptr=4<Tail, Ptr is incremented by one (Ptr=Ptr+1) at step S70, and then the flow returns to step S61. Conversely, if Ptr+4≧Tail, the flow immediately jumps to step S61.

If neither the upward moving key (↑) nor the downward moving key (↓) has been depressed but any other key has been depressed instead, the flow immediately returns to step S61 by the determination of step S64.

If the determination at step S64 indicates that a selection key has been depressed, latitude data and longitude data are fetched at step S65 from packet data, the packet number of which is expressed by the start packet number Ptr plus the selected frame number Col (Ptr+Col), and a map around the location corresponding to the fetched latitude data and longitude data is displayed at step S66.

In the above described conventional navigation system, however, in order to display a screen $FL_4$ for selecting route point data after terminating the screen $FL_3$ for selecting user registered location data, for example, the route point data selection screen $FL_4$ need be selected after the display is once returned to the atlas mode initial screen $FL_1$.

Thus, the conventional navigation system has a disadvantage that a larger number of procedures and manipulation steps are required to obtain desired map information, which leads to complicated manipulations.

OBJECTS AND SUMMARY OF THE INVENTION

It is therefore an object of the present invention to provide a navigation apparatus which is capable of displaying the coordinates of an arbitrary position on a map displayed on the screen with numerical values and effectively utilizing such coordinate data indicating the position.

It is another object of the present invention to provide a navigation system which is capable of reliably confirming and recognizing a destination without causing the user anxiety.

It is a further object of the present invention to provide a map displaying apparatus which is capable of readily selecting and displaying desired map information.

To solve the above problems, the present invention provides a navigation apparatus having position detecting means for detecting an vehicle's position and outputting vehicle's position data, storage means for storing map data, display means for displaying a variety of information, and display control means for displaying a map on the display means based on the map data and superimposing the vehicle's position on the map displayed on the display means based on the vehicle's position data, the navigation apparatus comprising position specifying means for specifying an arbitrary position on the map displayed on the display means; coordinate calculating means for calculating the latitude and longitude which are the coordinates of the actual location corresponding to the specified position on the map and outputting the same as coordinate data; and coordinate display control means for superimposing the coordinates of the actual in numerical values on the displayed map based on the coordinate data.

According to a first feature of the present invention, when the position specifying means is used to specify an arbitrary position on a map displayed on the screen, the coordinate calculating means calculates the latitude and longitude which indicate the actual coordinates of the specified position and outputs the same as coordinate data. In this way, the coordinate display control means displays the coordinates (latitude and longitude) of the position in numerical values on the displayed map on the basis of the coordinate data.

To solve the aforementioned problems, according to a second aspect of the present invention, there is provided a navigation apparatus having position detecting means for detecting an vehicle's position and outputting vehicle's position data, first storage means for storing map data, display means for displaying a variety of information, and display control means for displaying a map on the display means based on the map data and superimposing the vehicle's position on the map displayed on the display means based on the vehicle's position data, which is characterized by setting means for setting destination name data; second storage means for storing the set destination name data; and destination name display control means for displaying a destination name on the displayed map based on the destination name data.

According to a second feature of the present invention, when the user sets destination name data in the navigation apparatus using setting means such as a keyboard, a remote controller or the like, the navigation apparatus stores the set destination name data in second storage means such as a RAM. The destination name display control means thus displays the destination name based on the destination name data on a map displayed on the screen.

Since the destination name is superimposed on a map displayed on the display means, the destination can be readily confirmed and recognized.

To solve the aforementioned problems, according to a third aspect of the present invention, there is provided a map display apparatus having first storage means for storing map data, display means for displaying a variety of information, and map display control means for displaying a map on the display means based on the map data, which is characterized by comprising second storage means for classifying location name data on a plurality of locations and coordinate data corresponding thereto according to the category of the locations and storing the classified data; location name display means for sequentially displaying the location names of the plurality of categories on the display means based on the stored location name data; and selecting means for selecting a desired location based on the location names displayed on the display means, wherein the map display control means reads the map data around a location associated with the coordinate data corresponding to the location name selected by the selecting means and displays the map based on the map data.

According to a third feature of the present invention, the second storage means such as RAM, ROM, magnetic disk and optical disk classifies location name data on a plurality of locations and coordinate data corresponding thereto according to the category of the locations and stores therein the classified data. The location name display means such as a microcomputer sequentially displays the location names classified into a plurality of categories on display means. When the user selects a desired location from the location names displayed on the display means by way of the selecting means such as a keyboard and a remote controller, the map display control means such as a microcomputer reads data on a map around a location associated with the coordinate data corresponding to the location name selected by the selecting means, and the map is displayed on the basis of the map data.

Therefore, when the user merely selects a desired location from sequentially displayed location names in a plurality of categories, a map around the desired location is displayed, thus facilitating map display manipulation.

DESCRIPTION OF THE PREFERRED EMBODIMENTS

A first embodiment of the present invention will hereinafter be described with reference to FIGS. 9 through 16.

Figure 9:
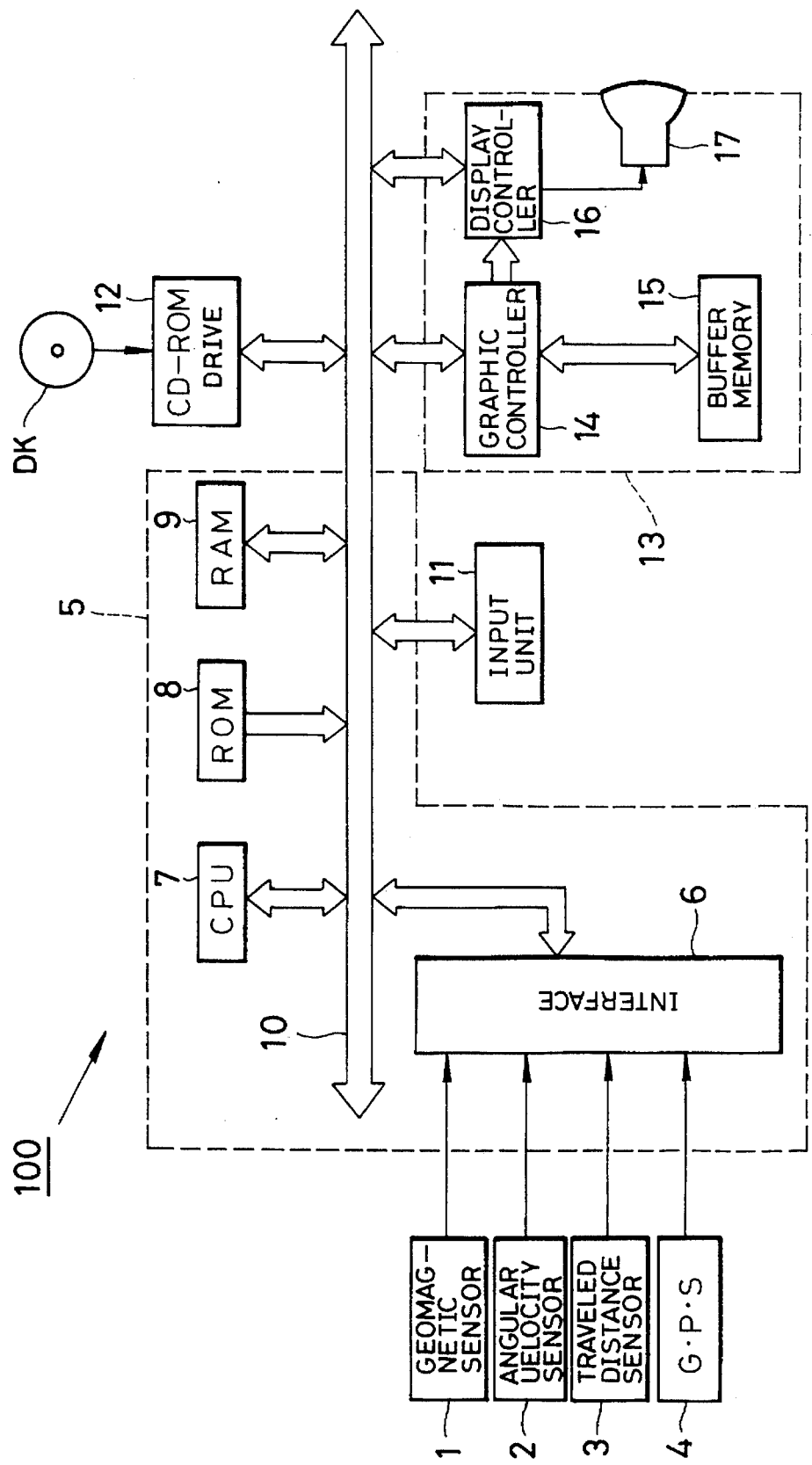
FIG. 9 is a block diagram generally showing the configuration of a navigation apparatus according to the present invention.

FIG. 9 shows in block form the basic configuration of the present invention when applied to a navigation apparatus for vehicle.

A navigation apparatus 100 for vehicle comprises a geomagnetic sensor 1 for outputting azimuth data on the running direction of a vehicle in which the navigation apparatus 100 is equipped; an angular velocity sensor 2 for detecting an angular velocity of the vehicle, when rotating, and outputting angular velocity data; a traveled distance sensor 3 for detecting a rotational speed of a shaft and outputting traveled distance data by integrating the detected rotational speed; a GPS receiver 4 for receiving radio wave from GPS satellites and outputting GPS position detecting data; a system controller 5 for controlling the whole navigation apparatus on the basis of the azimuth data, the angular velocity data, the traveled distance data, and the GPS position detecting data; an input unit 11 for inputting a variety of data; a CD-ROM drive 12 for reading and outputting a variety of data from a CD-ROM disk DK under the control of the system controller 5; and a display unit 13 for displaying a variety of display data under the control of the system controller 5.

The system controller 5 comprises an interface 6 for performing an interface operation with the outside; a CPU 7 for controlling the whole system controller 5; a ROM (Read Only Memory) 8 in which stored is a control program for controlling the system controller 5; and a RAM (Random Access Memory) 9 having a non-volatile memory portion, not shown, and for storing a variety of data in a writable manner. The system controller 5 is connected with the input unit 11, the CD-ROM drive 12 and the display unit 13 via a bus line 10. Here, the system controller 5 functions as a coordinate calculating means, a coordinate display control means, and a display control means.

The display unit 13 comprises a graphic controller 14 for controlling the whole display unit 13 on the basis of control a data sent from the CPU 7 via the bus line 10; a buffer memory 15 formed of memory devices such as VRAM (VIDEO RAM) for temporarily storing image information which can be instantly displayed; and a display control unit 16 for controlling the display on a display unit 17 such as a liquid crystal display unit or a CRT on the basis of image data outputted from the graphic controller 14.

The operation of the present embodiment will next be described with reference to FIGS. 10–16.

Figure 10:
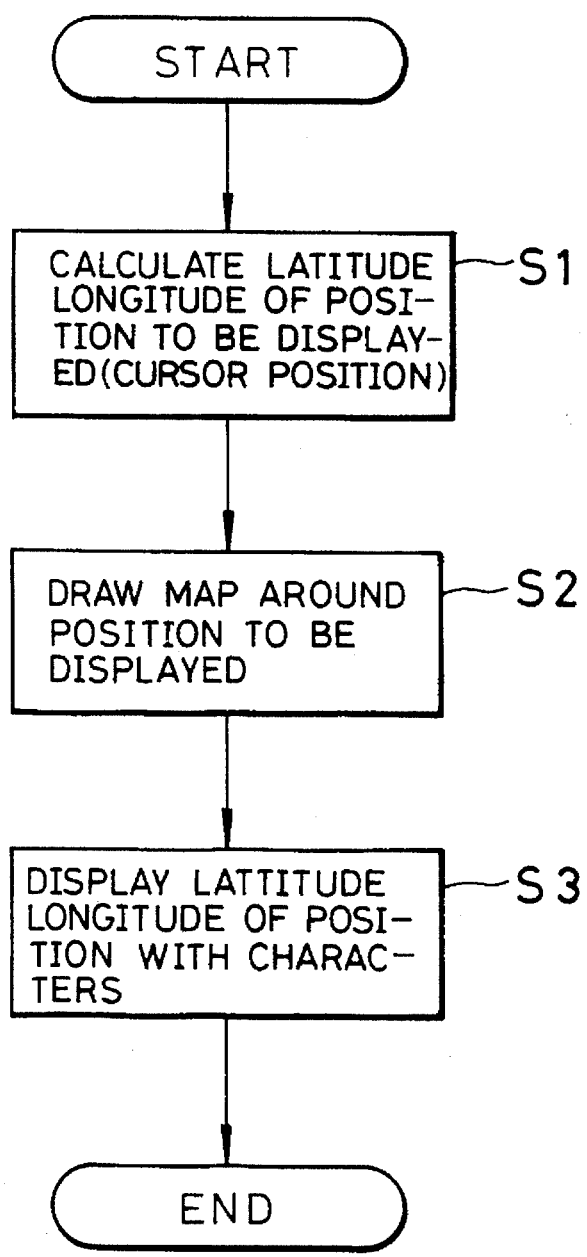
FIG. 10 is a flowchart generally showing the operation of the navigation apparatus.
Figure 13:
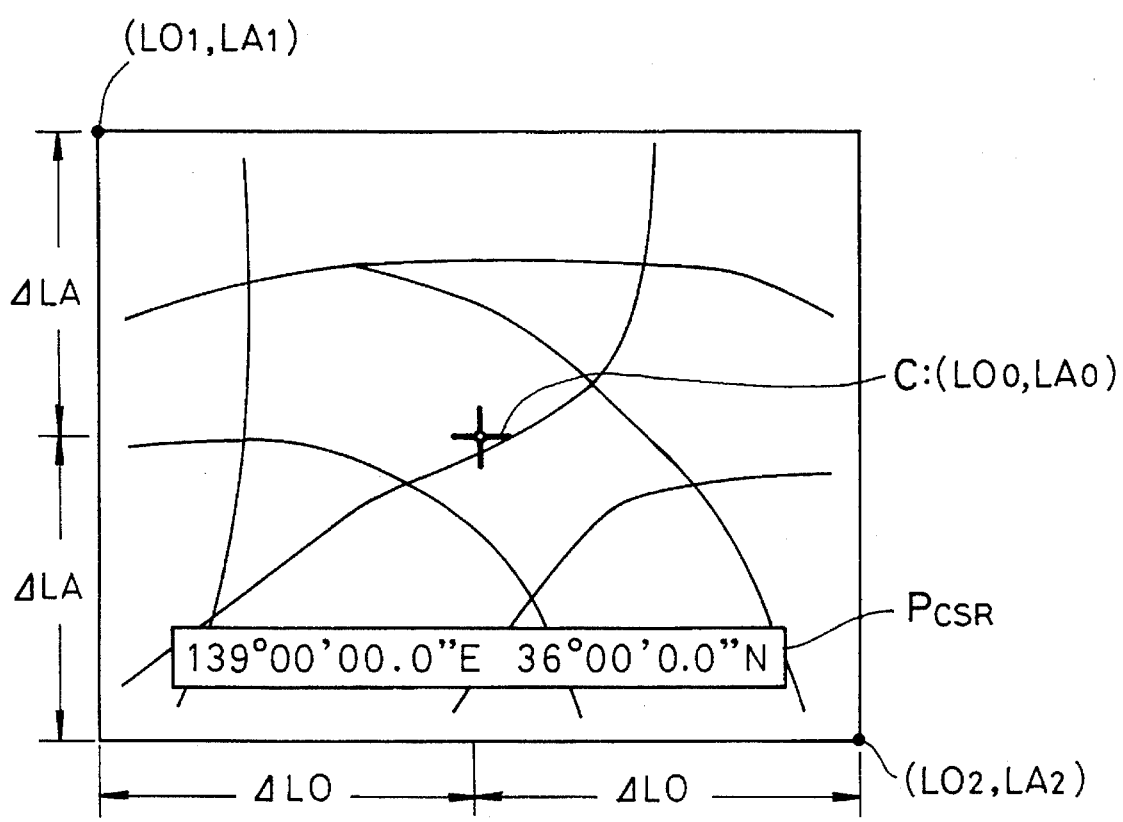
FIG. 13 is a diagram used for explaining an example of a display in a cursor position display mode.

FIG. 10 shows a processing flowchart generally showing the operation of the present embodiment. First, the system controller 5 calculates the latitude and longitude of a position to be displayed, for example, based on the position of a position specifying cursor (step S1). Specifically, assume that the latitude and longitude of a point specified by the position specifying cursor C are designated $LO_0$, $LA_0$, respectively, as shown in FIG. 13. Since displayable latitude and longitude ranges are uniquely determined by the scale of a display screen, assuming that a latitude range and a longitude range which can be displayed on the screen at a certain scale are represented by $2\Delta LO$, $2\Delta LA$, the coordinates of the upper left end $(LO_1, LA_1)$ and the coordinates of the lower right end $(LO_2, LA_2)$ of the display screen are respectively given by the following equations:

$$(LO_1, LA_1)=(LO_0-\Delta LO, LA_0+\Delta LA)$$

$$(LO_2, LA_2)=(LO_0+\Delta LO, LA_0-\Delta LA)$$

The foregoing is the case where the upward and downward directions (on the drawing) on the display screen coincide the northern and southern directions, respectively, i.e., the vertical direction on the display screen is parallel to the latitude. If the vertical direction on the displayed display is inclined with respect to the latitude (or the longitude) by a predetermined angle, the above calculated coordinates may be rotated by the predetermined angle to derive the correct coordinates for this case.

Next, map data on the position to be displayed is read from the CD-ROM disk DK on the basis of the calculated latitude and longitude of the position to be displayed through the bus line 10 and the CD-ROM drive 12 into the buffer memory 15. Simultaneously with this reading operation, the graphic controller 14 draws a map around the displayed position on the screen of the display unit 17 based on control data from the CPU 7 (step S2). Subsequently, the system controller 5 superimposes the latitude and longitude of the displayed position calculated at step S1 with characters (numerical values) on the screen (step S3), followed by the termination of this drawing processing.

Figure 16:
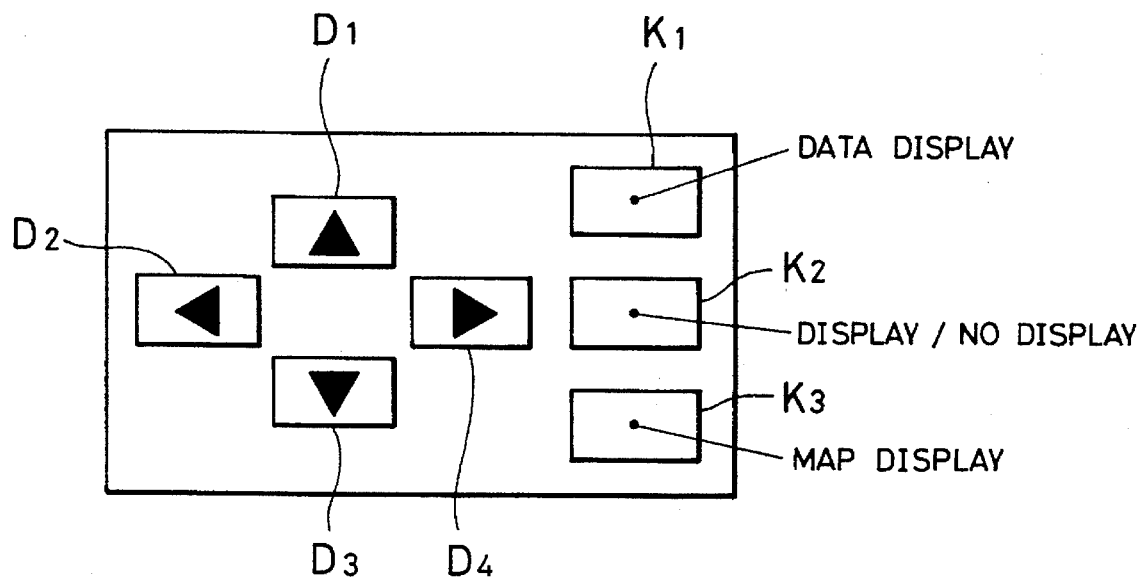
FIG. 16 is an explanatory diagram showing the arrangement of a commander.

Prior to detailed explanation of the operation, an input unit (commander) 11, used as a position specifying means, will be explained with reference to FIG. 16.

The commander 11 is provided with four direction keys $D_1$–$D_4$ for moving the position specifying cursor or a displayed map on the screen; a data display mode key $K_1$ for changing a data display mode; a display selection key $K_2$ for selecting whether data is displayed or not; and a map display mode key $K_3$ for selecting a map display mode.

In the present embodiment, there are provided the following three modes as data display modes:

1) An vehicle's position display mode for only displaying data on the coordinates of the position of the vehicle in which the navigation apparatus is mounted.

2) A cursor position display mode for only displaying data on the coordinates of the position of the position specifying cursor.

3) A mix mode for simultaneously displaying data on the coordinates of both positions of the vehicle and the position specifying cursor.

Also, the following two modes are provided as map display modes:

1. A smooth scroll mode in which a map is displayed with the vehicle or the position specifying cursor being placed at the center thereof, and the map is smoothly scrolled by a moving distance of the vehicle or the position specifying cursor.

2. A page scroll mode in which a map including the vehicle or the position specifying cursor is displayed, and a next adjacent map appears if the position of the vehicle or the position specifying cursor goes outside the displayed map.

The operation of the navigation apparatus according to the present embodiment will next be described for each of the data display modes with reference to FIGS. 11–16. It should be noted that the following description will be given mainly of the case where the smooth scroll mode is employed as the map display mode.

Figure 11:
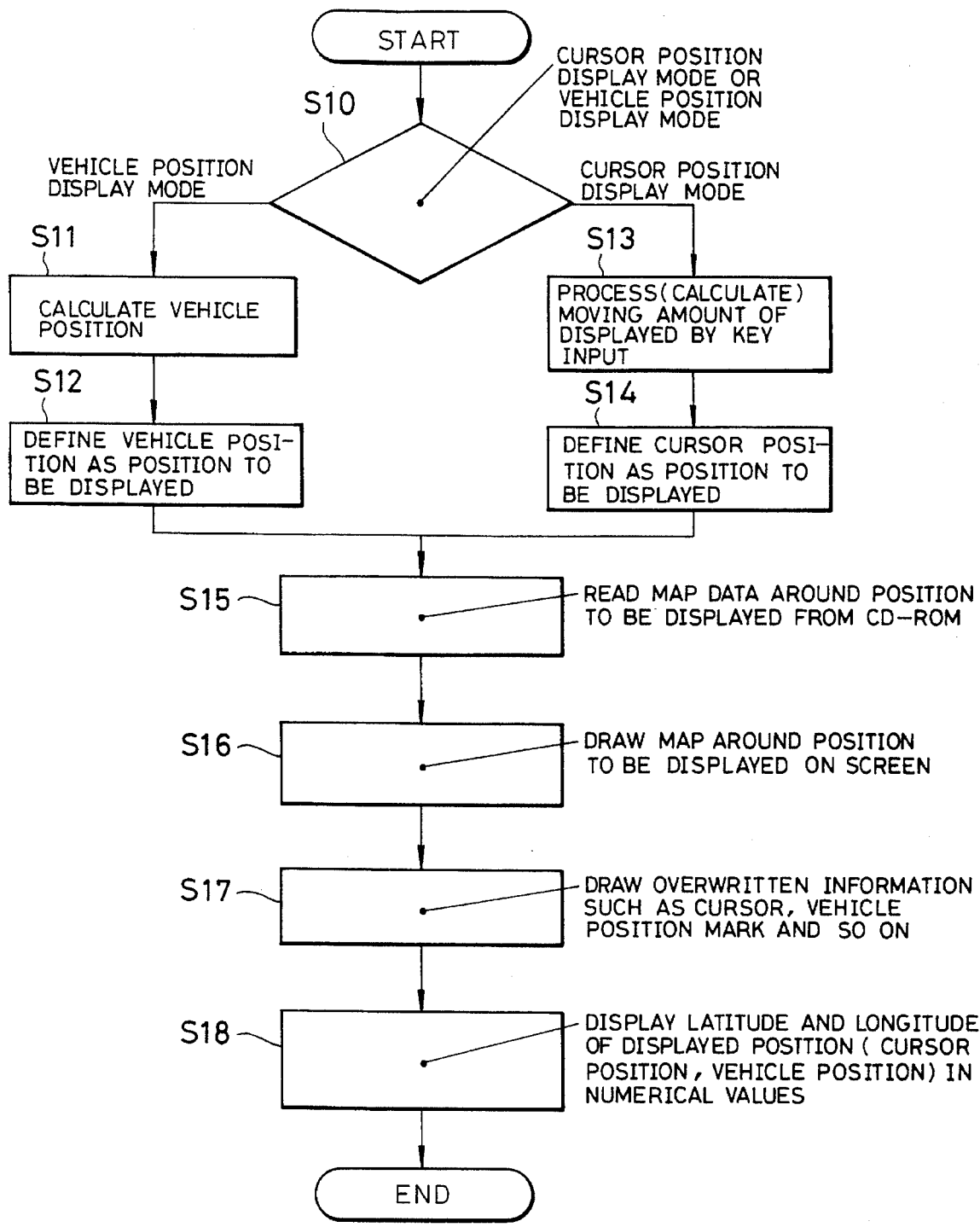
FIG. 11 is a flowchart (1) showing in detail the processing for displaying the coordinates of a position.

FIG. 11 shows a flowchart of the processing for displaying the coordinates of a position in the vehicle's position display mode and the cursor position display mode.

a) Vehicle's position Display Mode

The vehicle's position display mode will first be explained.

When a key is depressed on the input unit 11, the system controller 5 captures the contents of the operated key and determines whether the data display mode key $K_1$ thus inputted corresponds to the cursor position display mode or the vehicle's position display mode (step S10). Incidentally, this data display mode is assumed to be held until a mode change is next performed.

Since the vehicle's position display mode is selected in this case, the flow proceeds to step S11, where the position of the vehicle is calculated on the basis of azimuth data, angular velocity data, traveled distance data and GPS position detecting data (step S11).

Next, an area to be displayed is defined such that the vehicle's position is placed at the center of the area, and map data on that area is read from the CO-ROM disk DK (step S15), and a map around the vehicle's position is drawn on the screen of the display unit 17 (step S16).

Then, an vehicle position mark and the name of a principal building or the like are superimposed on the center of the map on the display screen (step S17), and the latitude and longitude of the vehicle's position are also displayed in a lower part of the display screen (step S18), followed by the termination of the processing.

Figure 12:
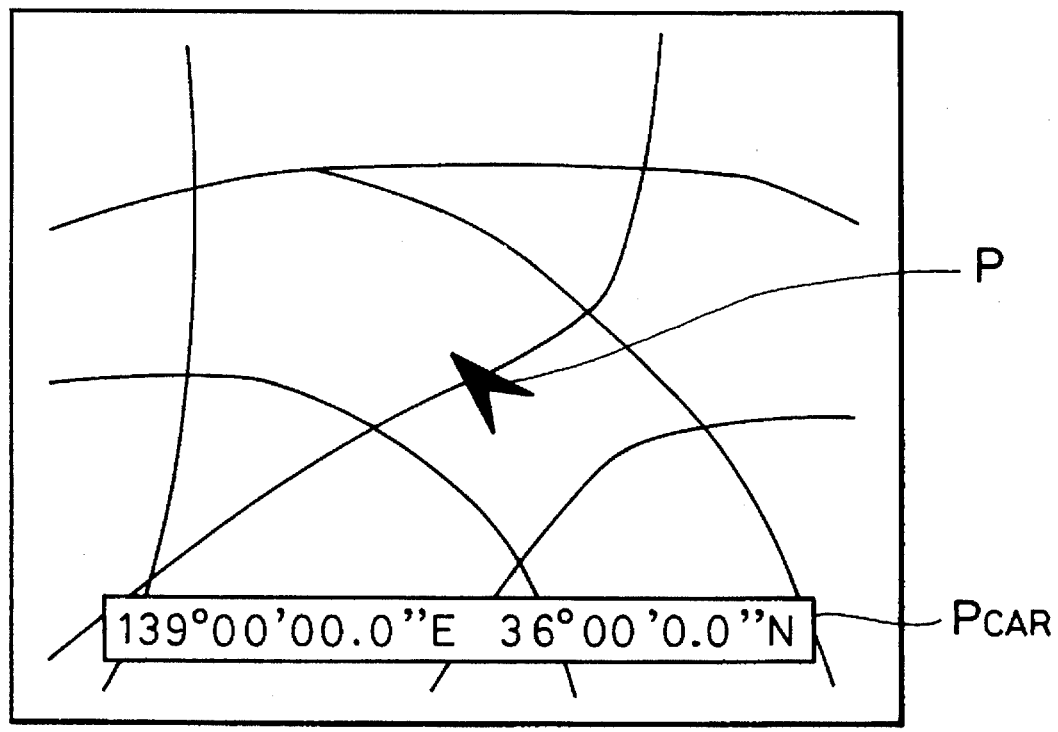
FIG. 12 is a diagram used for explaining an example of a display in an vehicle's position display mode.

FIG. 12 shows a displayed image on the screen after the foregoing position coordinates display processing has been completed.

By the above processing, the vehicle position mark P (indicated by an arrow head in the drawing) is displayed at the center of the map on the screen, and the latitude and longitude of the coordinates Pcar of the vehicle's position are also displayed in a lower part of the screen. More specifically, it can be seen from FIG. 12 that the coordinates Pcar of the vehicle's position indicate a location at longitude 139° E and latitude 36° N. The coordinates Pcar of the vehicle's position vary momently as the vehicle moves.

b) Cursor Position Display Mode

Referring back to FIG. 11, the cursor position display mode will next be explained.

When a key is depressed on the input unit 11, the system controller 5 first captures the contents of the inputted key and determined whether the data display mode key $K_1$ thus inputted corresponds to the cursor position display mode or the vehicle's position display mode (step S10).

Since the cursor position display mode is selected in this case, the flow proceeds to step S13, where moving amounts of the display position in the four directions by manipulating the four respective direction keys $D_1$–$D_4$ are calculated to determine where the display position. Next, an area to be displayed is defined such that the position specifying cursor is positioned at the center of the area, and map data on the defined area is read from the CO-ROM disk DK (step S15), and a map over the defined area is drawn on the screen of the display unit 17 (step S16).

Then, the position specifying cursor C and the name of a principal building or the like are superimposed on the center of the map on the display screen (step S17), and the latitude and longitude of the cursor position are also displayed in a lower part of the display screen (step S18), followed by the termination of the processing.

The map on the display screen, after the foregoing coordinate display processing has been completed, is shown in FIG. 13.

It can be seen from FIG. 13 that the position specifying cursor C (indicated by a mark "+" in the drawing) is displayed at the center of the map on the display screen, and the latitude and longitude or the coordinates $P_{CSR}$ of the cursor position are also displayed in a lower part of the screen. More specifically, it can be seen that the coordinates $P_{CSR}$ of the current cursor position indicate a location at longitude 139° E and latitude 36° N. The coordinates $P_{CSR}$ of the cursor position vary when the user manipulates the direction keys $D_1$–$D_4$. More specifically, a depression of the direction key $D_1$ causes the displayed map to move upwardly by one step portion; a depression of the direction key $D_2$ causes the displayed map to move to the left by one step portion; a depression of the direction key $D_3$ causes the displayed map to move downward by one step portion; and a depression of the direction key $D_4$ causes the displayed map to move to the right by one step portion. Consequently, the coordinates of the current position vary by portion corresponding to one step portion every time a key is depressed.

c) Mix Mode

The mix mode will be explained in continuation. The following explanation will be given of the case where the position specifying cursor C is displayed at the center of the screen.

Figure 14:
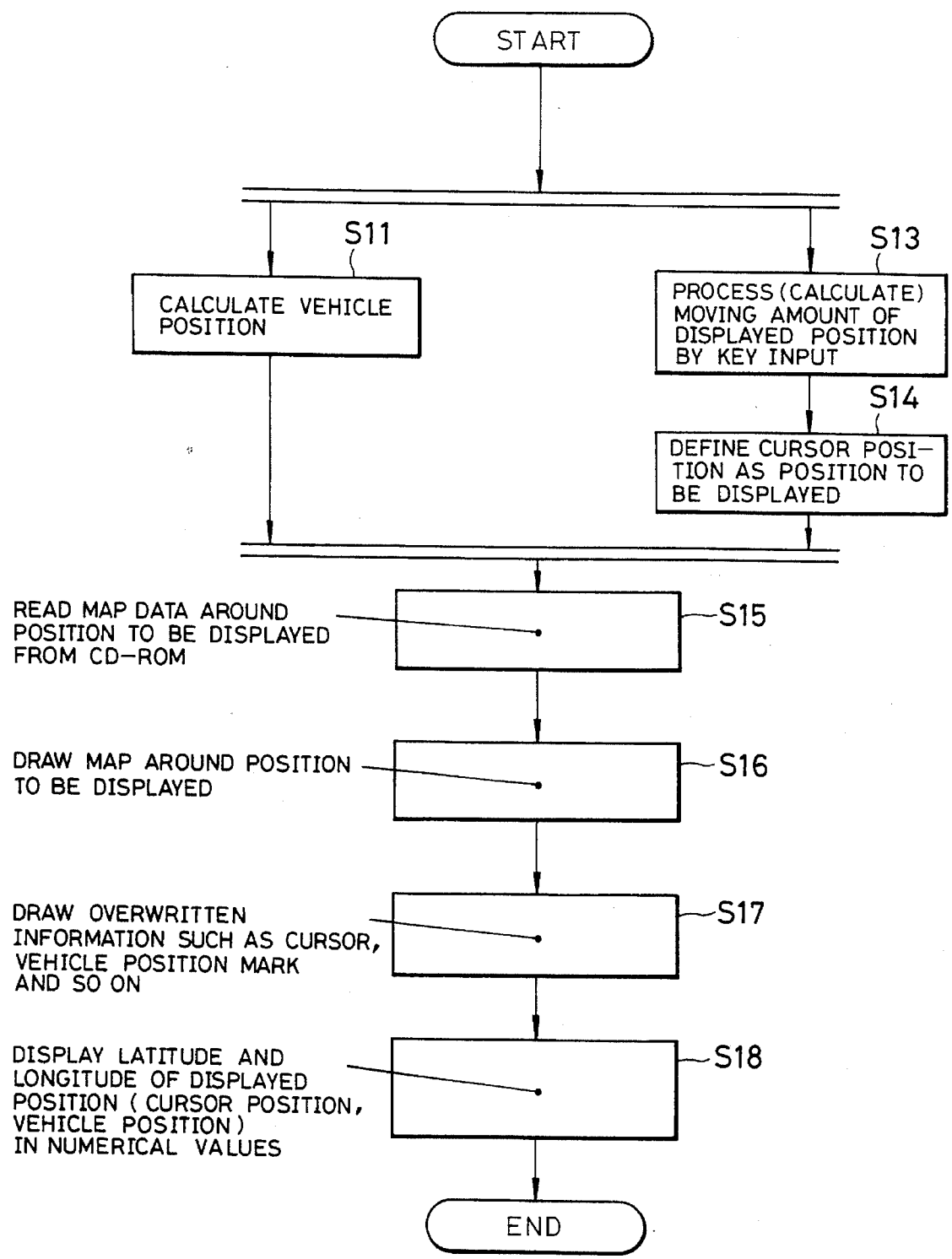
FIG. 14 is a flowchart (2) showing in detail the processing for displaying the coordinates of a position.

FIG. 14 shows a flowchart of the processing for displaying the coordinates of a position in the mix mode. Since the mix mode is a combination of the vehicle's position display mode nd the cursor position display mode, the steps S11 and S13 are executed in parallel.

First, the vehicle's position is calculated on the basis of azimuth data, angular velocity data, traveled distance data and GPS position detecting data (step S11).

Simultaneously with this step, moving amounts of the display position in the four directions by manipulating the four respective direction keys $D_1$–$D_4$ are calculated (step S13) to determine the display position. Then, an area to be displayed is defined with the position specifying cursor being placed at the center of the area (step S14).

Next, map data on the area to be displayed is read from the CO-ROM disk DK (step S15), and a map over that area is drawn on the screen of the display unit 17 (step S16).

Then, the position specifying cursor C is superimposed at the center of the map displayed on the screen, and the vehicle position mark P and the name of a principal building or the like are also superimposed at predetermined positions on the map (step S17). Further, the latitudes and longitudes, i.e., the coordinates PCSR of the displayed position of the position specifying cursor C and the coordinates $P_{CAR}$ of the vehicle's position are displayed in lower separate parts of the screen (step S18), followed by the termination of the processing.

Figure 15:
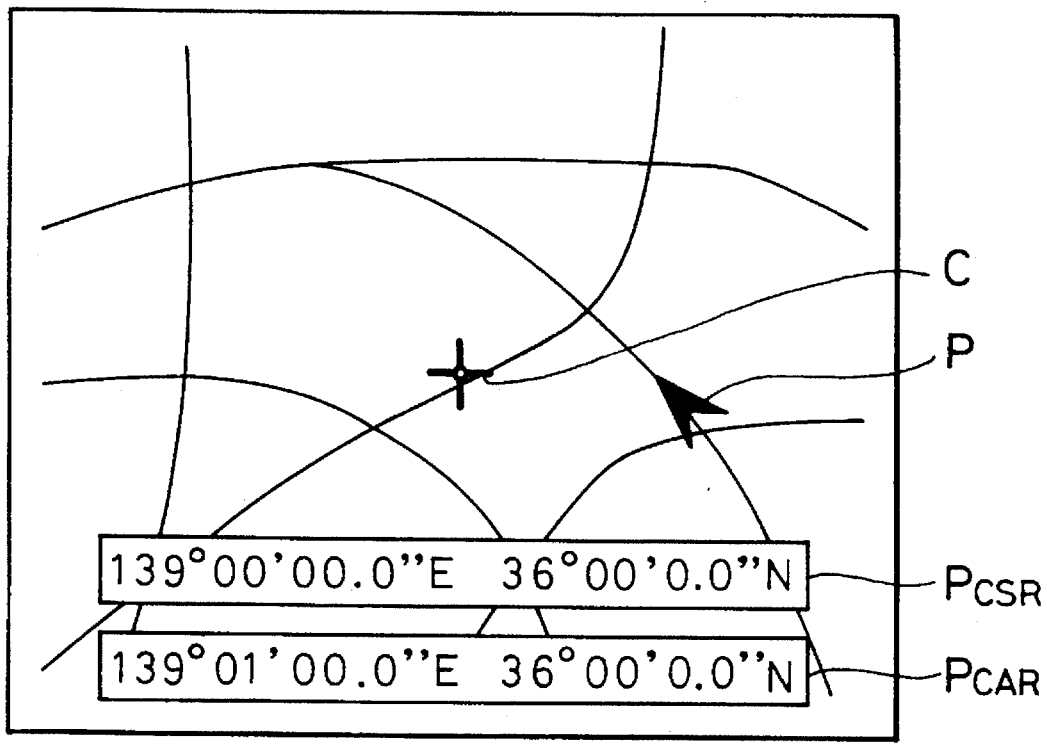
FIG. 15 is a diagram used for explaining an example of a display in a mix mode.

An image on the screen after the foregoing coordinate display processing has been completed is shown in FIG. 15. By the processing described above, the position specifying cursor C (indicated by a mark "+" in the drawing) is displayed at the center of the map on the display screen, and the vehicle position mark P (indicated by an arrow head in the drawing) is displayed at a position on the screen corresponding to the actually running location. Additionally displayed in lower parts of the screen are the latitude and longitude or the coordinates $P_{CSR}$ of the position at which the position specifying cursor C exists as well as the latitude and longitude or the coordinates PCAR of the vehicle's position. Explaining in greater detail, it can be seen that the coordinates $P_{CSR}$ of the current position of the position specifying cursor indicate a location at longitude 139° E and latitude 36° N, while the coordinates $P_{CAR}$ of the current vehicle's position indicate a location at longitude 139° 1"E and latitude 36° N. The coordinates $P_{CAR}$ of the vehicle's position momently vary as the vehicle moves.

As described above, according to the present embodiment, since the coordinates of an arbitrary position on a map displayed on the screen can be viewed as numerical data, effects such as the following can be produced:

1) a currently displayed area is readily known;
2) it is easy to compare a location with another location;
3) it is easy to compare a displayed area with a printed map or the like;
4) position data is readily communicated with another user of the navigation apparatus; and
5) destination data can be received from another user of the navigation apparatus in the form of numerical values and inputted therein.

While the foregoing embodiment has been described only for the case where the position specifying cursor is displayed at the center of the screen, the navigation apparatus may be constructed such that the map display is set in a page scroll mode, wherein the position specifying cursor C is moved to an arbitrary point on the screen using the direction keys $D_1$–$D_4$, and thus the coordinates of the point are displayed on the screen.

Also, although the foregoing embodiment has been described for the case where the coordinates of a position are displayed, alternatively, a plurality of navigation apparatuses may directly communicate data on the coordinates of positions with one another via radio communications or the like, in which case a destination or the like set by a navigation apparatuses.

According to a first feature of the present invention, when the position specify even in an unknown region, and relative positional relationships between a plurality of navigation apparatuses can be immediately understood, thereby achieving effective utilization and common use of the coordinate data.

Next, another embodiment of the present invention will be described below with reference to FIGS. 17–26. It should be noted that since the basic configuration of the navigation system for use in a vehicle of the present embodiment is the same as the configuration shown in FIG. 9, explanation thereof will not be repeated here.

The operation of the present embodiment will be described below with reference to FIGS. 17–26.

Figure 17:
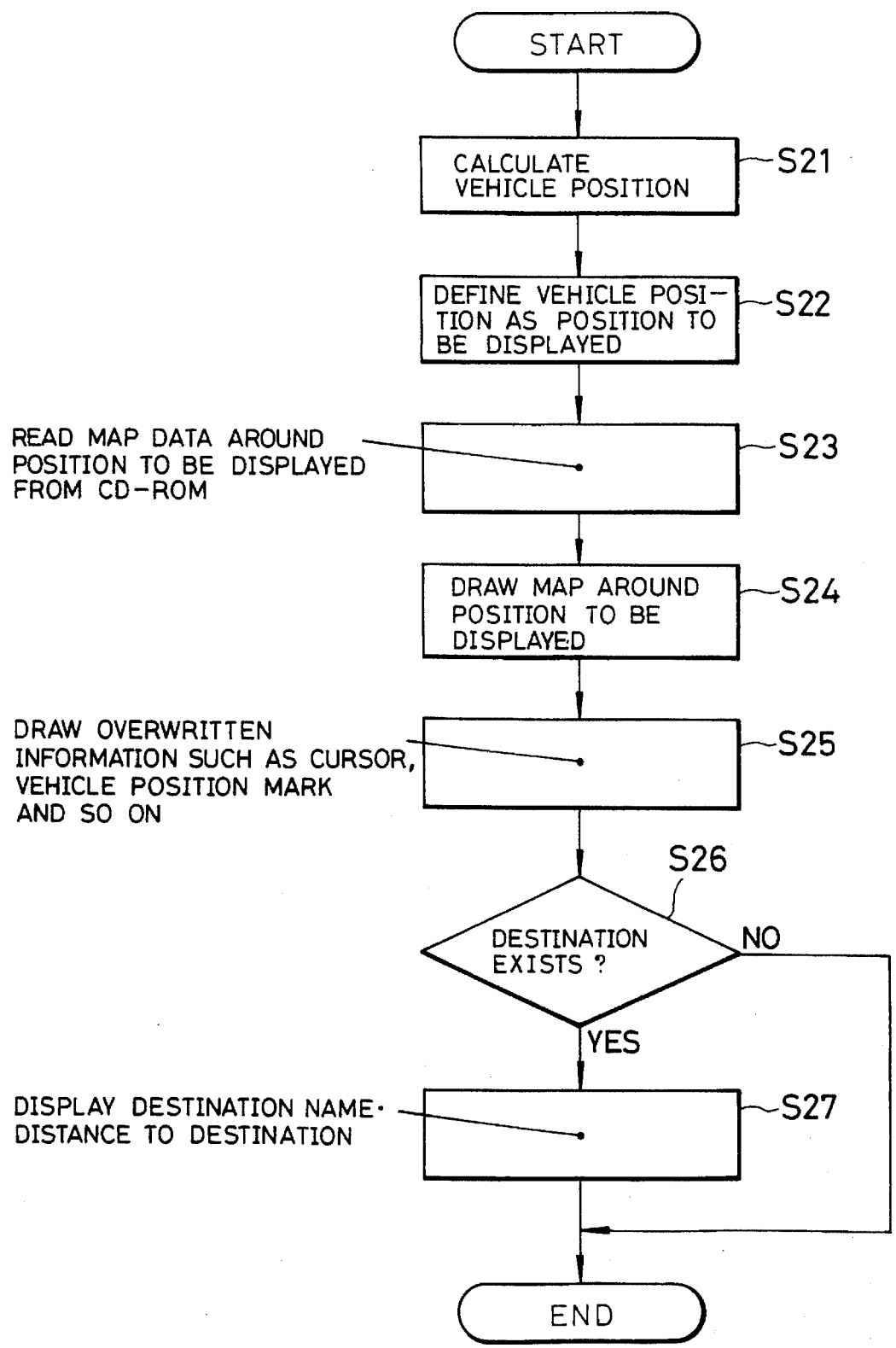
FIG. 17 is a processing flowchart generally showing the operation of a navigation system of the present invention.

FIG. 17 is a processing flowchart generally showing the operation of the present embodiment.

First, the system controller 5 calculates the vehicle's position on the basis of azimuth data, angular velocity data, traveled distance data and GPS position detecting data (step S21). Next, the vehicle's position is determined to be a position to be displayed (step S22), and data on a map around the position to be displayed is read from the CD-ROM disk DK into the buffer memory 15 through the bus line 10 and the CD-ROM drive 12. Simultaneously with this, the graphic controller 14 draws a map around the position to be displayed on the screen of the display unit 17 on the basis of control data from the CPU 7 (step S24). The graphic controller 14 further superimposes a cursor, an vehicle position mark and so on the map displayed on the screen based on a variety of data from the system controller 5 (step S25). The system controller 5 next determines whether or not a destination has previously been set (step S26). If no destination has been set, the drawing processing is terminated. Conversely, if there is a previously set destination, the name of the destination and a straight distance from the current position to the destination are further superimposed on the map on the screen (step S27), followed by the termination of the drawing processing.

The destination setting operation will now be described with reference to FIGS. 18–25.

Figure 23:
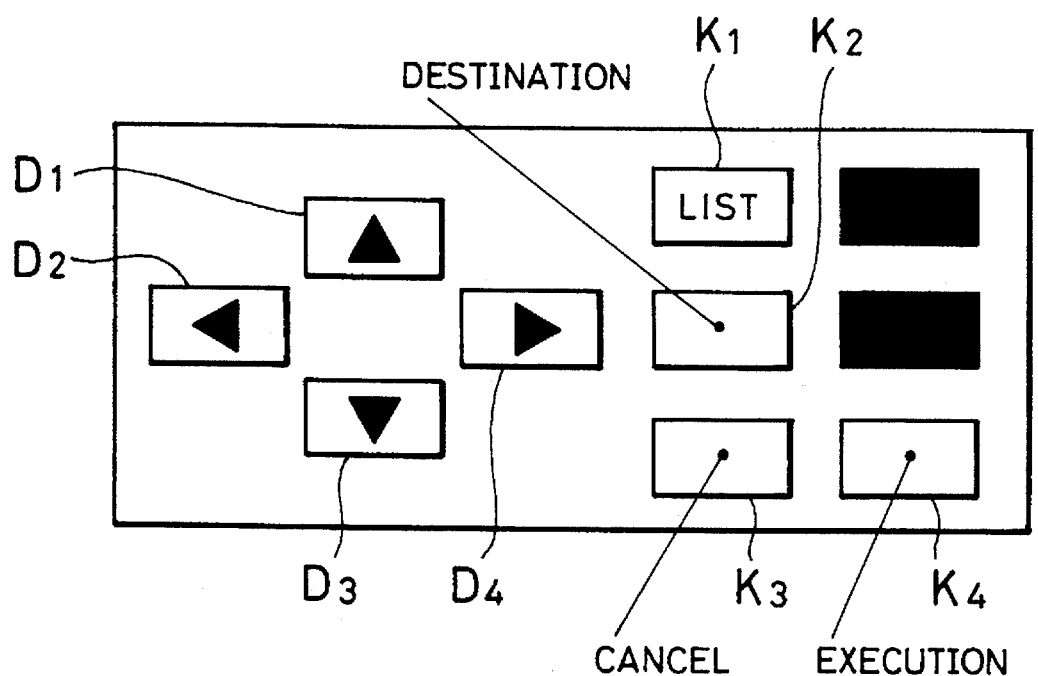
FIG. 23 is an explanatory diagram showing the arrangement of a commander.

First, explanation will be given of an input unit (commander) 11 used as a means for setting a destination with reference to FIG. 23.

The commander 11 is provided with four direction keys $D_1$–$D_4$ for selecting characters and items to be inputted; a list key $K_1$ for displaying a list of destination names which have previously been registered in the navigation system; a destination key $K_2$ for registering the name of a destination; a cancel key $K_3$ for canceling a character or an item once selected by the direction keys $D_1$–$D_4$; and an execution key $K_4$ for determining a character or an item selected by using the direction keys $D_1$–$D_4$.

Figure 18:
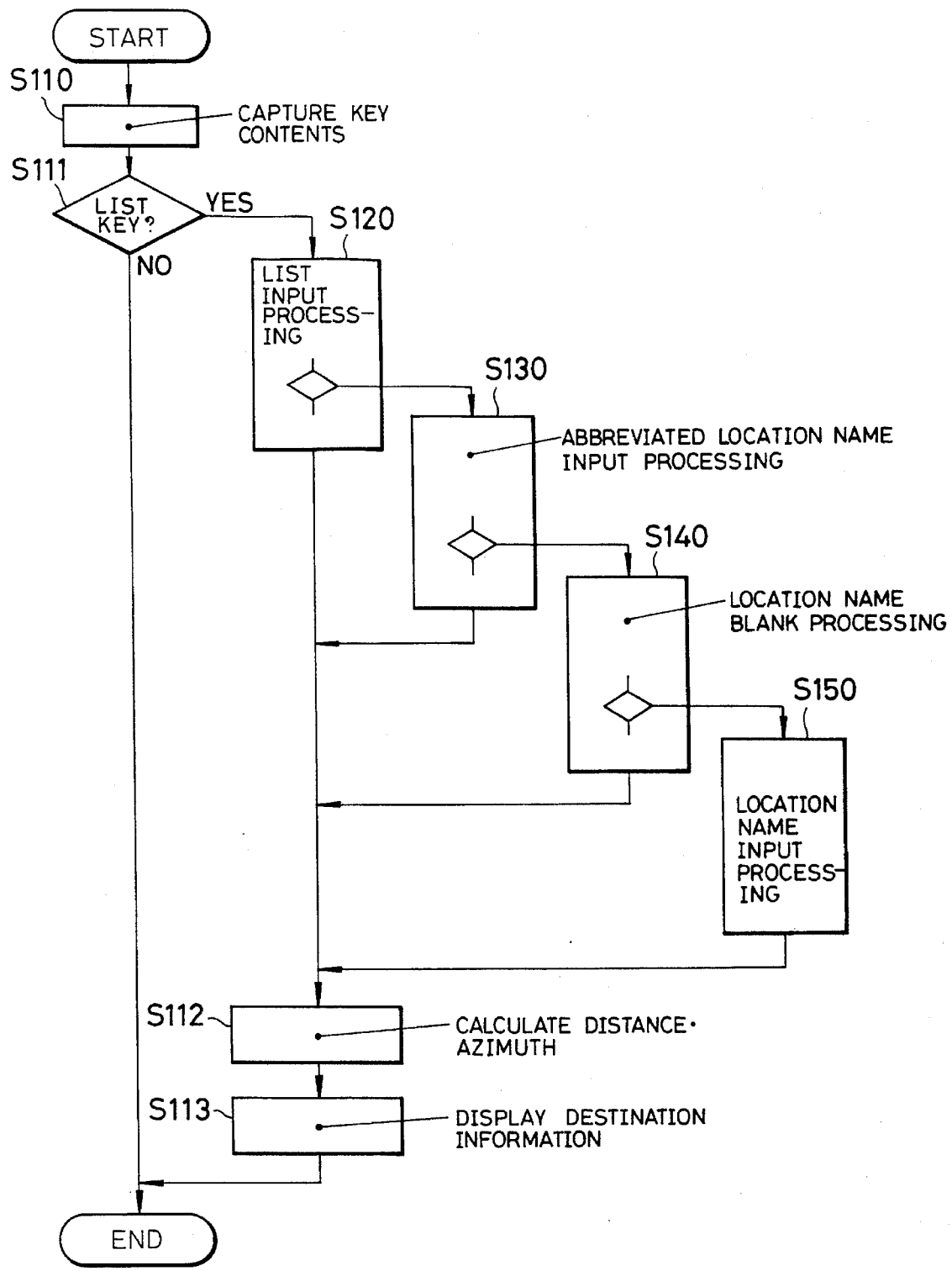
FIG. 18 is a flowchart generally showing the processing for setting a destination.

FIG. 18 is a flowchart generally showing the destination setting processing.

When a key is depressed on the input unit 11, the system controller 5 first captures the contents of the inputted key (step S110) and determines whether or not the inputted is the list key $K_1$ (step S111). If the inputted key is not the list key $K_1$, the destination setting processing is terminated, and other processing will be executed.

Conversely, if the inputted key is the list key $K_1$, the flow proceeds to a list input processing routine (step S120). After the list input processing S120 has been executed, the distance to a destination and the azimuth are calculated (step S112), and destination information on a destination selected from the list is displayed on the screen of the display unit 17 (step S113). Thus, the destination setting processing is terminated, and other processing will be executed.

If the list input processing S120 is not executed, the flow proceeds to abbreviated destination name input processing (step S130). After the abbreviated destination name input processing has been executed similarly to the list input processing S120, the distance to a destination and the azimuth are calculated (step S112), destination information including an abbreviated destination name is displayed on the screen of the display unit 17 (step S113). Thus, the destination setting processing is terminated, and other processing will be executed.

Further, if the abbreviated destination name input processing S130 is not executed, the flow proceeds to destination name blank processing (step S140). After the destination name blank processing S140 has been executed similarly to the list input processing S120, the distance to a destination and the azimuth are calculated (step S112), and destination information excluding a destination name is displayed on the screen of the display 17 (step S113). Thus, the destination setting processing is terminated, and other processing will be executed.

Furthermore, if the destination name blank processing S140 is not executed, the flow proceeds to destination name input processing (step S150), where a desired destination name is inputted. Then, the distance to the destination and the azimuth are calculated (step S112), and destination information including the inputted destination name is displayed on the screen of the display unit 17 (step S113). Thus, the destination setting processing is terminated, and other processing will be executed.

Next, the list input processing S120, the abbreviated destination name input processing S130, the destination name blank processing S140, and the destination name input processing S150 will be explained in detail.

a) List Input Processing S120

Figure 19:
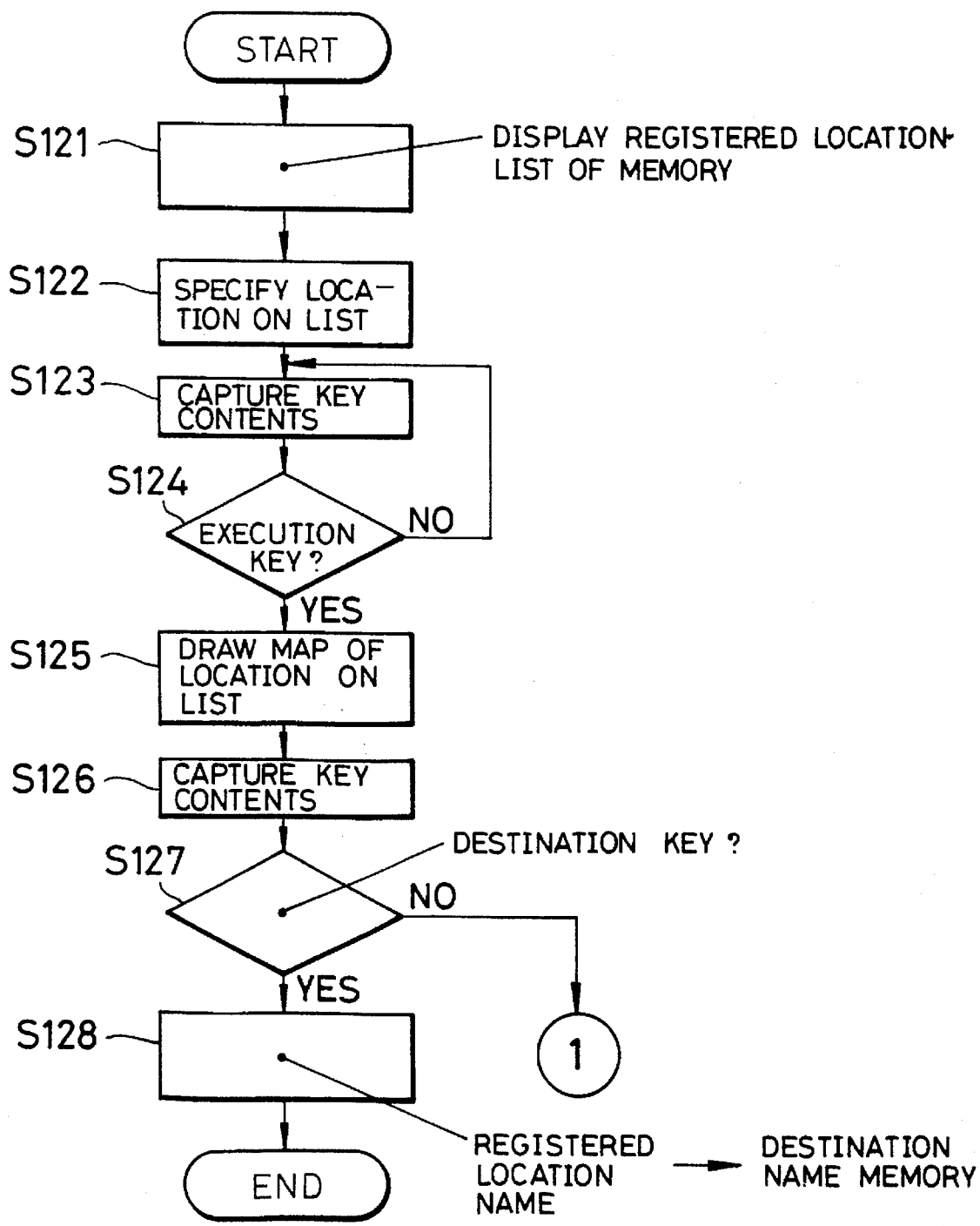
FIG. 19 is a flowchart showing in detail the processing for inputting a list.

The list input processing S120 will first be explained in detail with reference to FIGS. 19 and 24.

The list input processing S120 is executed to display a destination name list on the screen of the display unit 17 based on destination name data stored on the RAM 9.

Figure 24:
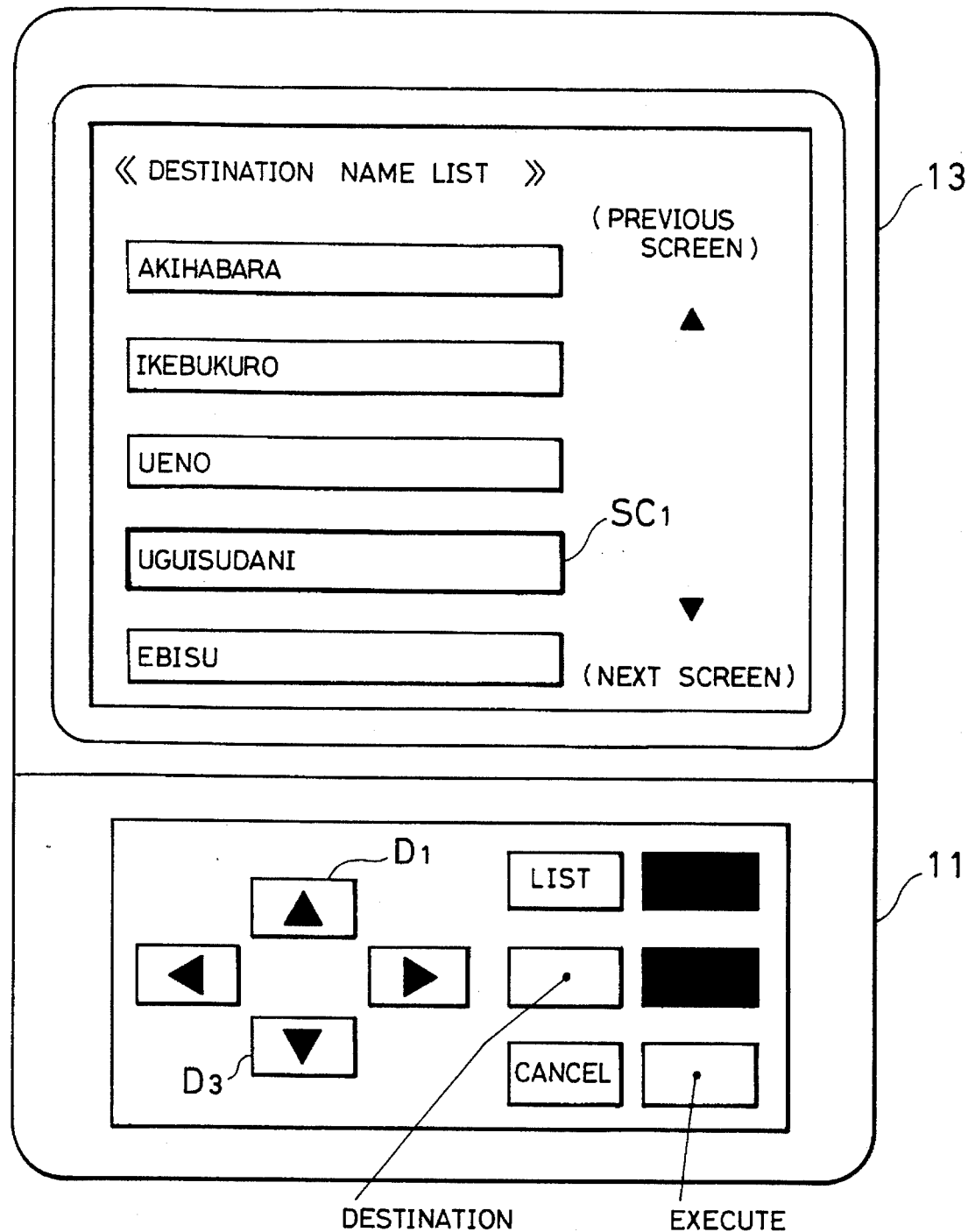
FIG. 24 is a diagram used for explaining a screen for inputting a list.

The displayed destination name list includes previously registered location names, as shown in FIG. 24, wherein a selecting cursor $SC_1$ (represented by a thick line frame in the drawing) is moved upward or downward by depressing the direction keys $D_1$ or $D_3$, such that one of the destination names can be selected on the list (step S122). It should be noted that continuous depression of the direction keys $D_1$ or $D_3$ with the selecting cursor $SC_1$ being on the uppermost or lowermost item will cause a destination name list on the previous or next page to be displayed on the screen.

When a destination name on the list has been specified, the CPU 7 captures the contents of an inputted key (step S123) and determines whether or not the execution key $K_4$ has been depressed (step S124). If the execution key $K_4$ has not been depressed, the CPU 7 waits for the same to be depressed.

When the execution key $K_4$ has been depressed, map data around a location corresponding to the specified destination name on the list is read from the CD-ROM disk DK, and a map is drawn on the screen of the display unit 17 (step S125).

The CPU 7 again captures the contents of an inputted key (step S126), and determines, at this time, whether or not the destination key $K_2$ has been depressed (step S127). If the destination key $K_2$ is not depressed, the flow proceeds to the abbreviated destination name input processing S130.

When the destination key $K_2$ has been depressed, the registered location name thus selected is transferred to a destination name memory area in the RAM 9 and stored therein (step S128).

b) Abbreviated Destination Name Input Processing S130

Figure 20:
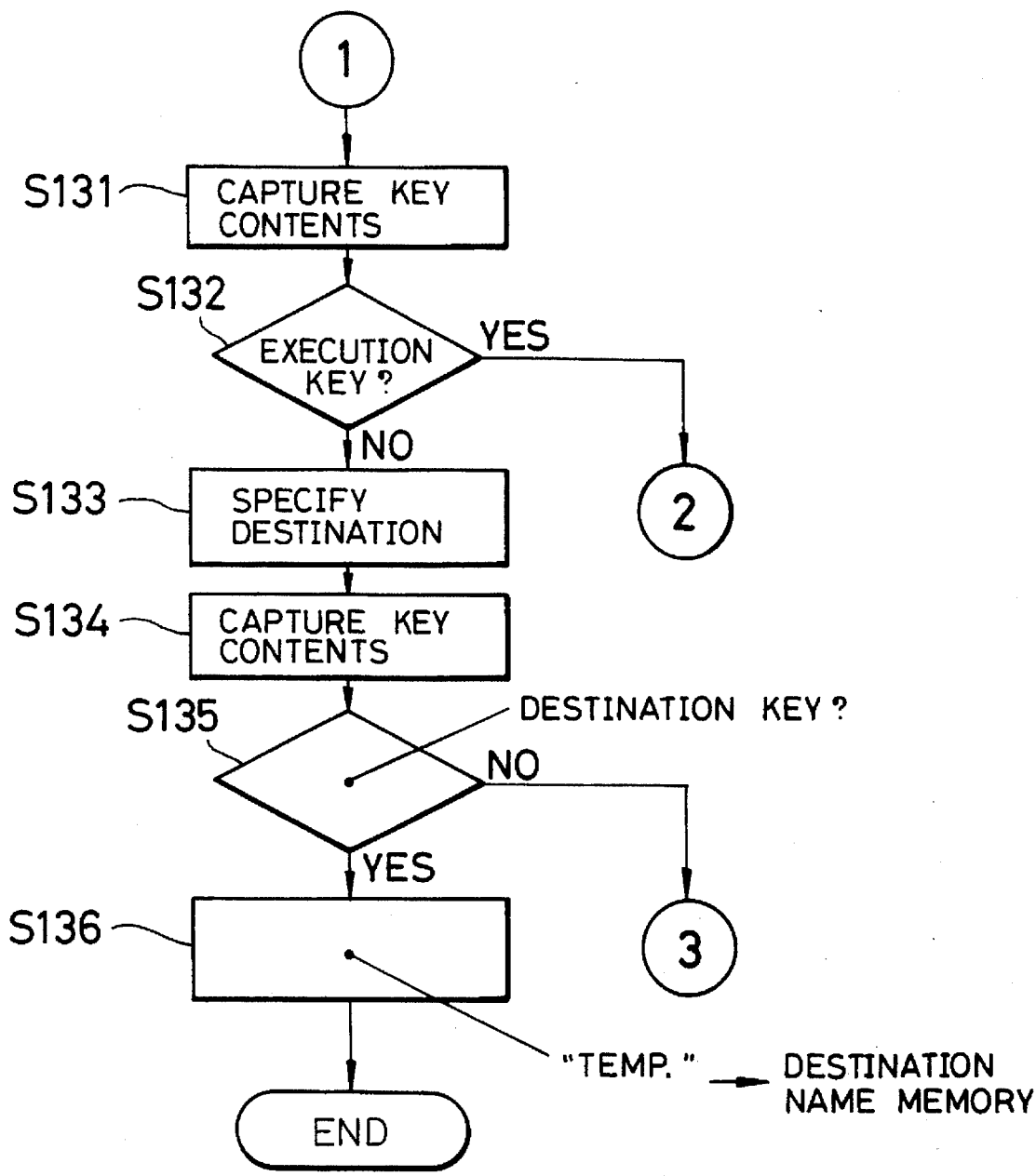
FIG. 20 is a processing flowchart showing in detail the processing for inputting an abbreviated destination name.

Next, the operation of the abbreviated destination name input processing S130 will be explained in detail with reference to FIG. 20.

In the abbreviated destination name input processing S130, the CPU 7 captures the contents of an inputted key (step S131) and determines whether or not the execution key $K_4$ has been depressed (step S132). If the execution key $K_4$ has been depressed, the flow jumps to step S143 of the destination name blank processing S140 shown in FIG. 21.

If the execution key $K_4$ is not depressed, a destination name is specified by a destination specifying cursor (not shown) displayed on the map on the screen (step S133).

The CPU 7, responsive thereto, captures the contents of an inputted key (step S134) and determines whether or not the destination key $K_2$ has been depressed (step S135). If the destination key $K_2$ is not depressed, the flow proceeds to the destination name blank processing S140.

When the destination key $K_4$ has been depressed, an abbreviated destination name "TEMP." is transferred to the destination name memory area in the RAM 9 and stored therein (step 136) as well as stores the coordinates (for example, the latitude and longitude) of a position at which the destination specifying cursor exists as the destination coordinates. In this way, the destination name displayed on the display screen is "TEMP." with which the straight distance between the destination coordinates and the current position is also displayed.

c) Destination Name Blank Processing S140

Figure 21:
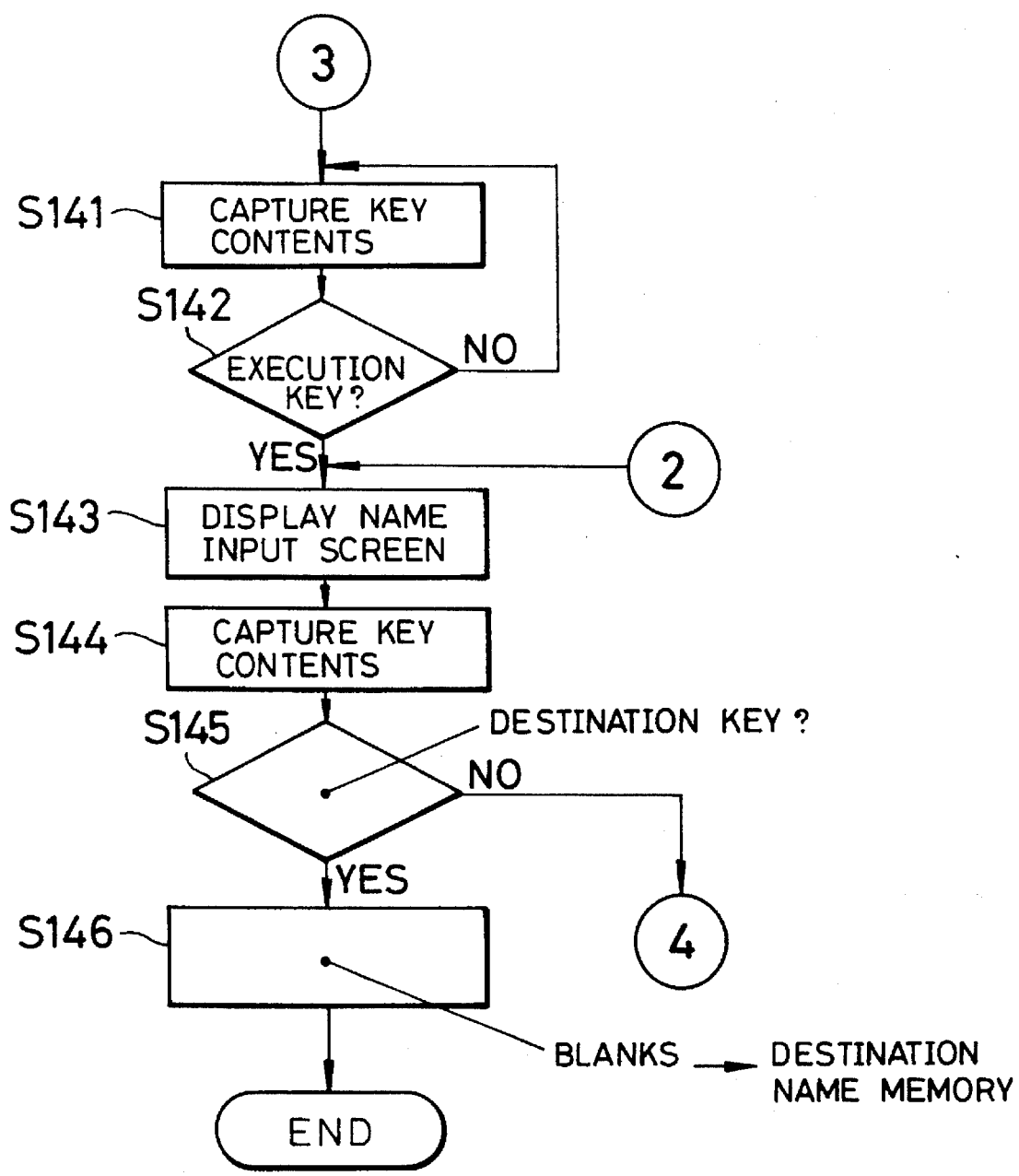
FIG. 21 is a processing flowchart showing in detail the destination name blank processing.
Figure 25:
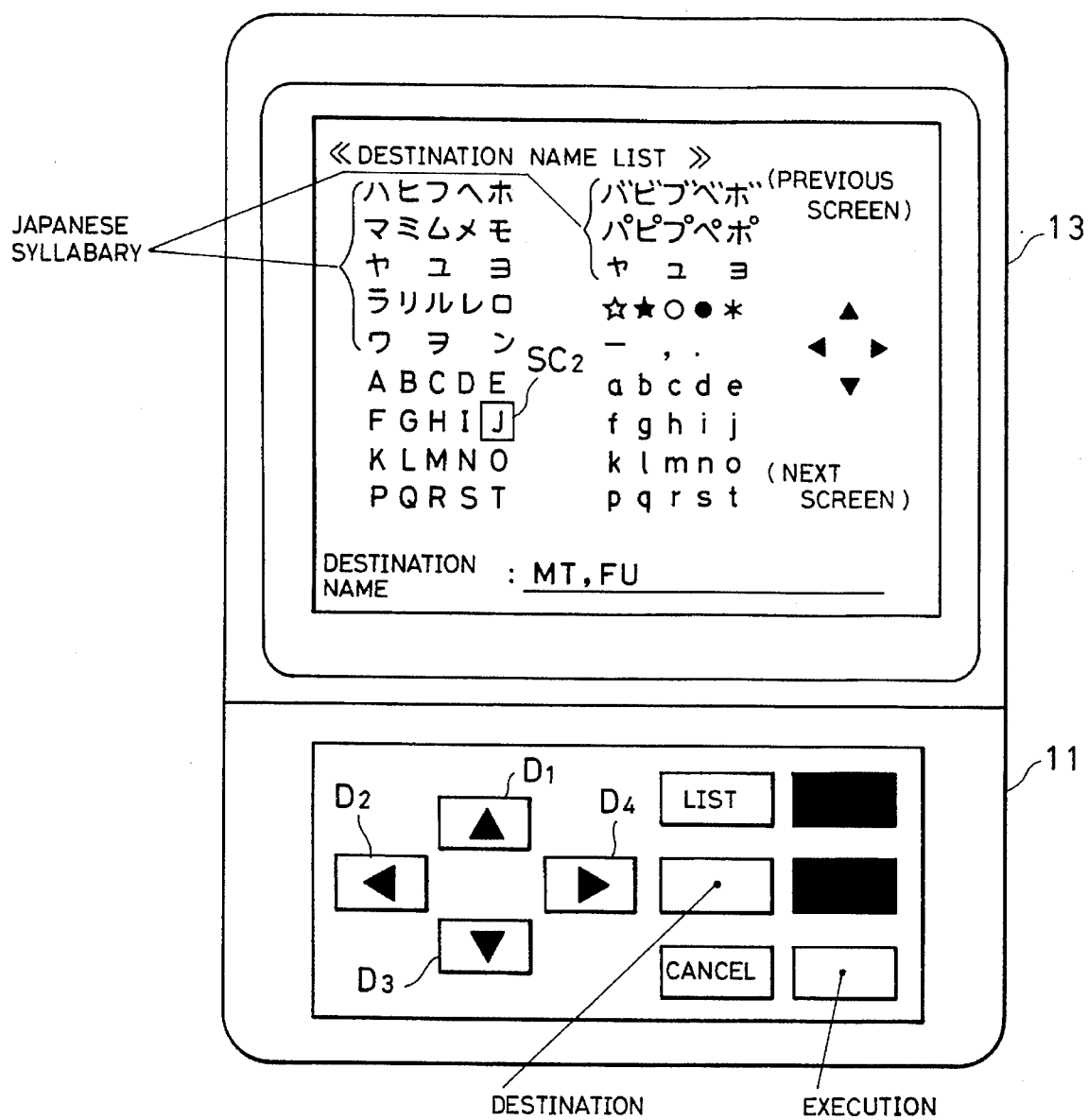
FIG. 25 is a diagram used for explaining a screen for inputting a destination name.

Next explained is the destination name blank processing S140 with reference to FIGS. 21 and 25.

In the destination name blank processing S140, the CPU 7 captures the contents of an inputted key (step S141) and determines whether or not the execution key $K_4$ has been depressed (step S142). If the execution key $K_4$ is not depressed, the flow returns to step S141.

When the execution key K4 has been depressed, a name input screen shown in FIG. 25 is displayed (step S143).

The CPU 7 again captures the contents of an inputted key (step S144) and determines at this time whether or not the destination key $K_2$ has been depressed (step S145). If the destination key $K_2$ is not depressed, the flow proceeds to the destination name input processing S150.

When the destination key $K_2$ has been depressed, a string of blanks are transferred to the destination name memory area in the RAM 9 and stored therein (step S128), whereby the destination name is not displayed on the screen.

d) Destination Name Input Processing S150

Figure 22:
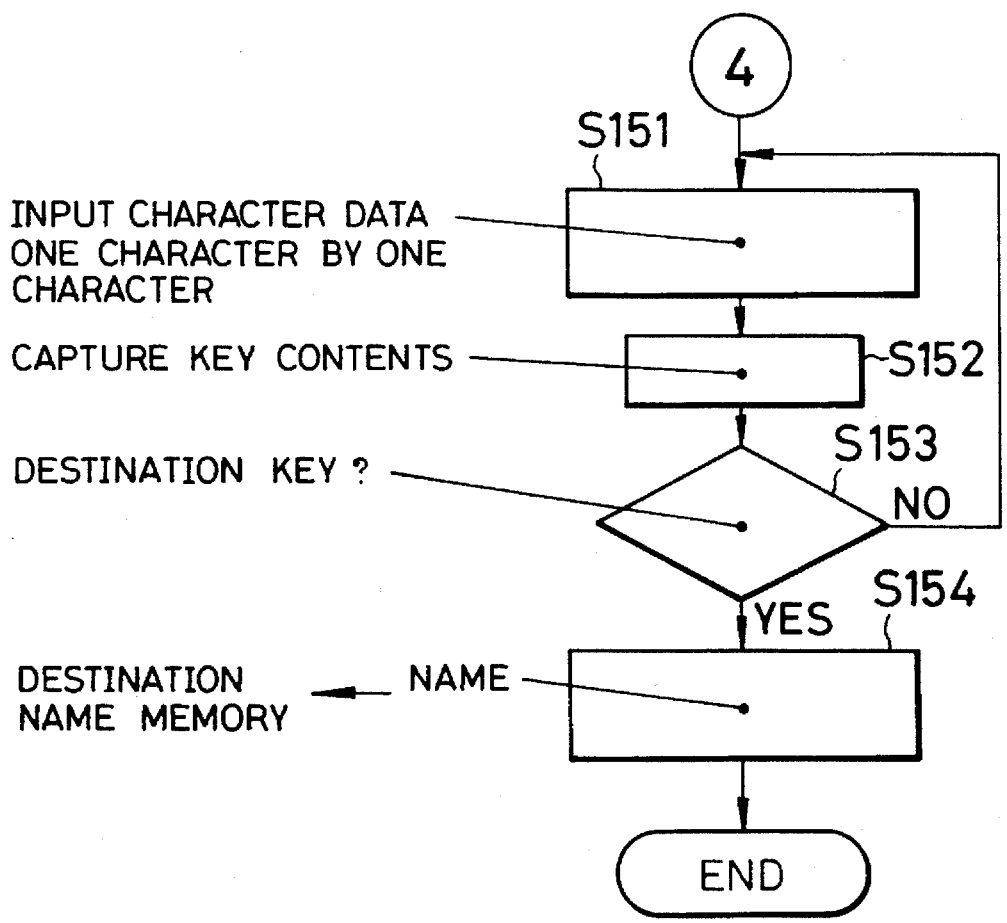
FIG. 22 is a processing flowchart showing in detail the processing for inputting a destination name.

The operation of the destination name input processing S150 will next be explained in detail with reference to FIGS. 22 and 25.

When the destination name input processing S150 has been started, the name input screen (see FIG. 25) has been displayed by step S143 of the destination name blank processing S140. In this state, a destination name is inputted one character by one character from character data provided on the screen (step S151). More specifically, the direction keys $D_1$–$D_4$ are manipulated to select character data displayed on the screen. For example, if character data "J" is to be inputted, a character data selecting cursor $SC_2$ (represented by a thick line frame in the drawing) is moved to upward, left, downward or right direction by the direction key $D_1$–$D_4$ to be placed ont he character data "J." Then, the execution key $K_4$ is depressed to determine the selection of the character data "J" which is then transferred to and displayed in an input window. Incidentally, FIG. 25 shows that "MT. FU" have been inputted for a destination name "MT. FUJI" which is desired to be inputted. If the user becomes aware of an error after having depressed the execution key $K_4$, the previously determined character data is canceled by depressing the cancel key $K_3$.

Simultaneously with the above operation, the CPU captures the contents of an inputted key (step S152) and determines whether or not the destination key $K_2$ has been depressed (step S153). If the destination key $K_2$ is not depressed, the flow returns again to step S151.

When the destination key $K_2$ is depressed after a desired destination name has been inputted in the foregoing manner, the inputted destination name, e.g., "MT. FUJI" in the above example, is transferred to the destination name memory area in the RAM 9 and stored therein (step S128). In this way, "MT. FUJI" is displayed on the screen of the display unit 17 as the destination name.

Figure 26:
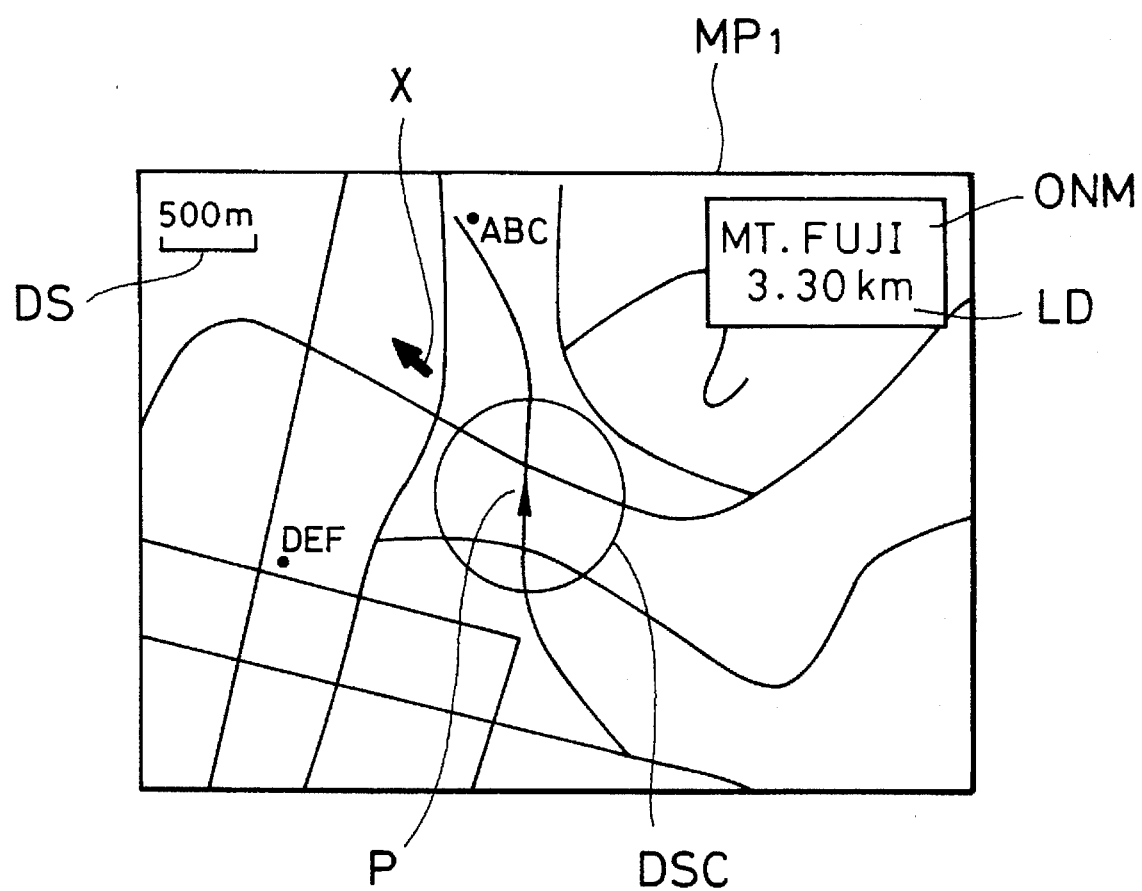
FIG. 26 is a diagram used for explaining a display screen of the present embodiment.

FIG. 26 shows a screen on which "MT. FUJI" is displayed as a destination name. Specifically in FIG. 26, a map $MP_1$ is displayed on the screen, which includes the positions of buildings or the like which may each serve as a guide (indicated by "." in the drawing) and their names (indicated by "ABC" and "DEF" in the drawing). Also displayed on the screen are a distance scale DS for this map $MP_1$ in an upper left portion thereof and the current vehicle's position P (a triangle mark) and a range scale DSC from the current vehicle's position (for example, a circle indicating a region within a 500 meter radius). Further displayed on the screen as destination information are an inputted destination name ONM (="MT. FUJI") and a straight distance LD from the current position to the destination in an upper right portion thereof as well as the azimuth from the current position indicated by an arrow X.

As explained above, even when a desired destination does not exist within a map currently displayed on the screen, its name is displayed on the screen, so that the user, even if having forgotten a location set as the destination, can readily recognize and confirm to which he or she is directing only by viewing the displayed destination name.

Although the foregoing embodiment has been described for the case where a destination name is temporarily registered, an inputted destination name and the coordinates (latitude, longitude and so on) corresponding thereto may be stored in a non-volatile memory portion of the RAM 9 such that a desired destination name can be selected at the next time by the list input processing. In the latter case, the CPU 7, upon displaying a list, may refer not only to the CD-ROM disk DK but also to the non-volatile memory portion of the RAM 9.

Also, although the input unit 11 has a display unit 13, integrated therewith in the foregoing embodiment, they may be separately constructed, or they may be remotely controllable units through infrared ray or the like.

Further, although the foregoing embodiment has been described for the case where a single destination is set, the navigation apparatus of the present invention may be constructed to allow a plurality of destination names to be set. In the latter case, it is possible to display the name of the destination which is located nearest from a current position or display the plurality of destination names in the set order. It is also possible to simultaneously display the plurality of destination names. When a plurality of destination names have been set, it is also possible to construct the navigation apparatus to automatically determine that a destination has been reached, for example, on the basis of a condition that the distance between the destination and the current position becomes below a predetermined value, and to automatically display a next destination name. According to a second feature of the present invention as described above, when the user sets destination name data in the navigation apparatus using the setting means such as a keyboard, a remote controller or the like, the navigation apparatus stores the set destination name data in the second storage means such as a RAM. The destination name display control means thus superimposes the destination name based on the destination name data on a map displayed on the screen, whereby the user readily confirms and recognizes the destination and therefore is free from anxious feeling.

Figure 4:
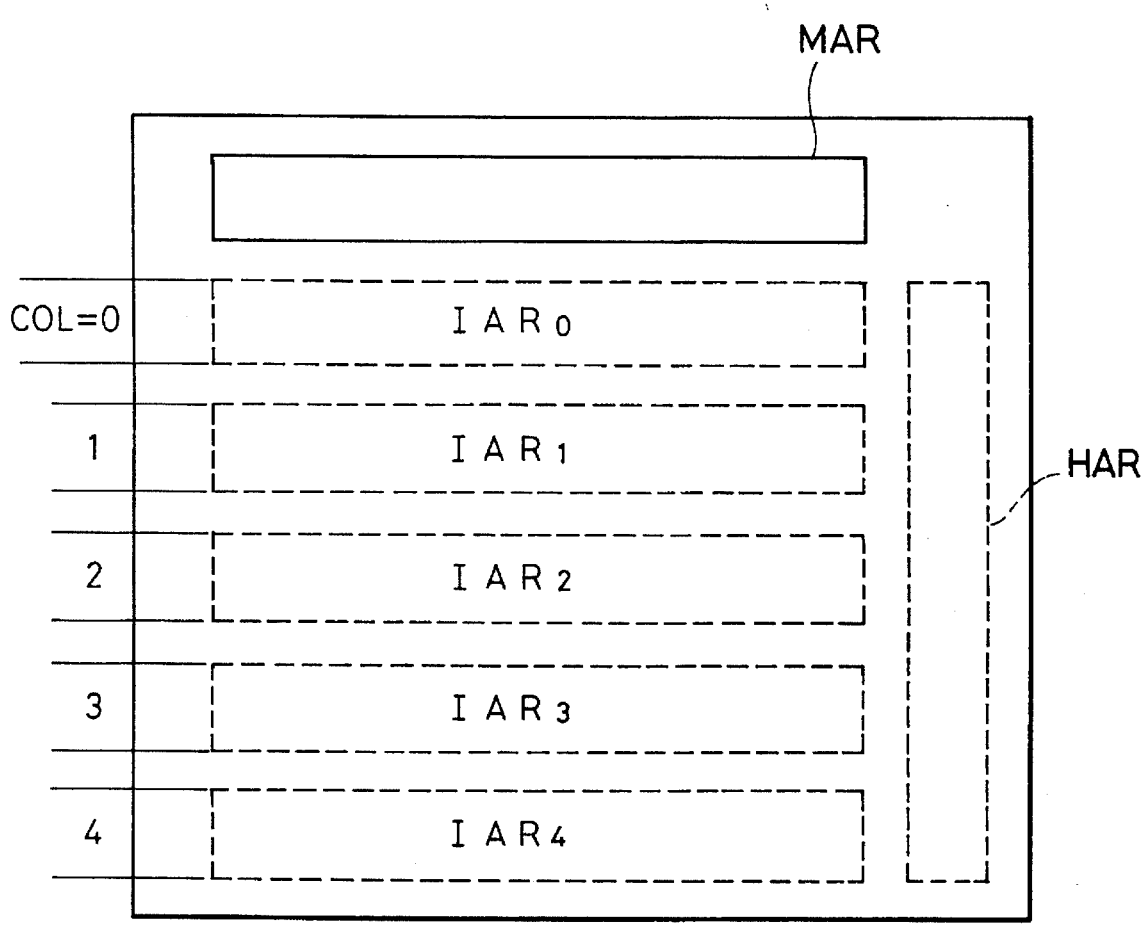
FIG. 4 is an explanatory diagram showing the arrangement of various areas on a display screen.
Figure 5:
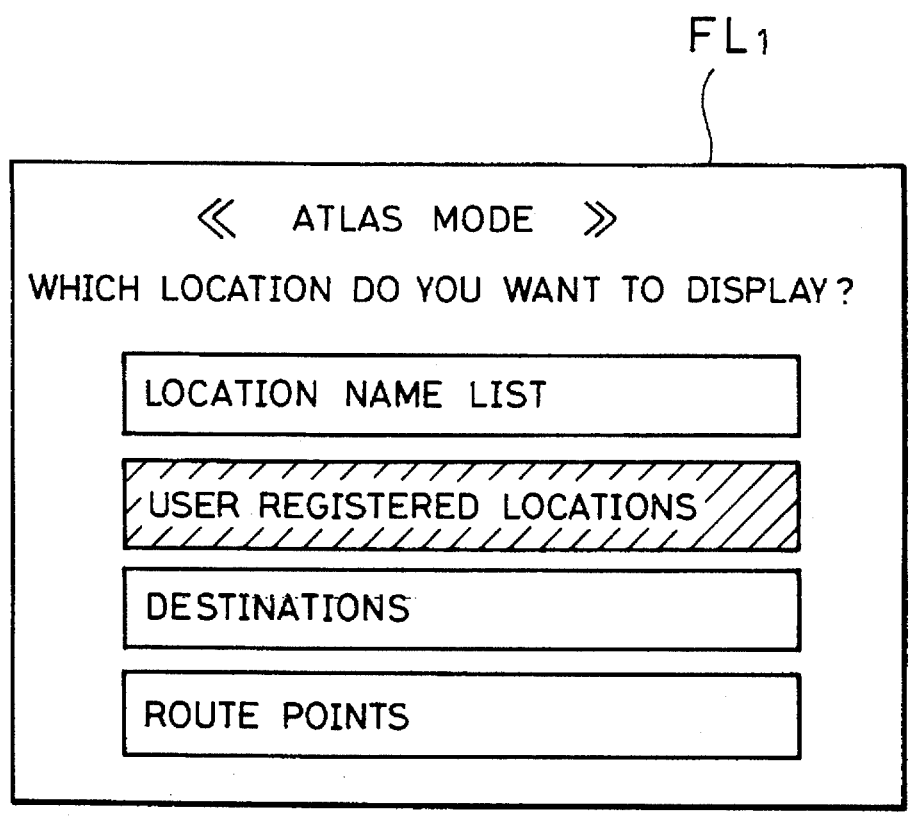
FIG. 5 is an explanatory diagram showing an example of an atlas mode initial image.
Figure 6:
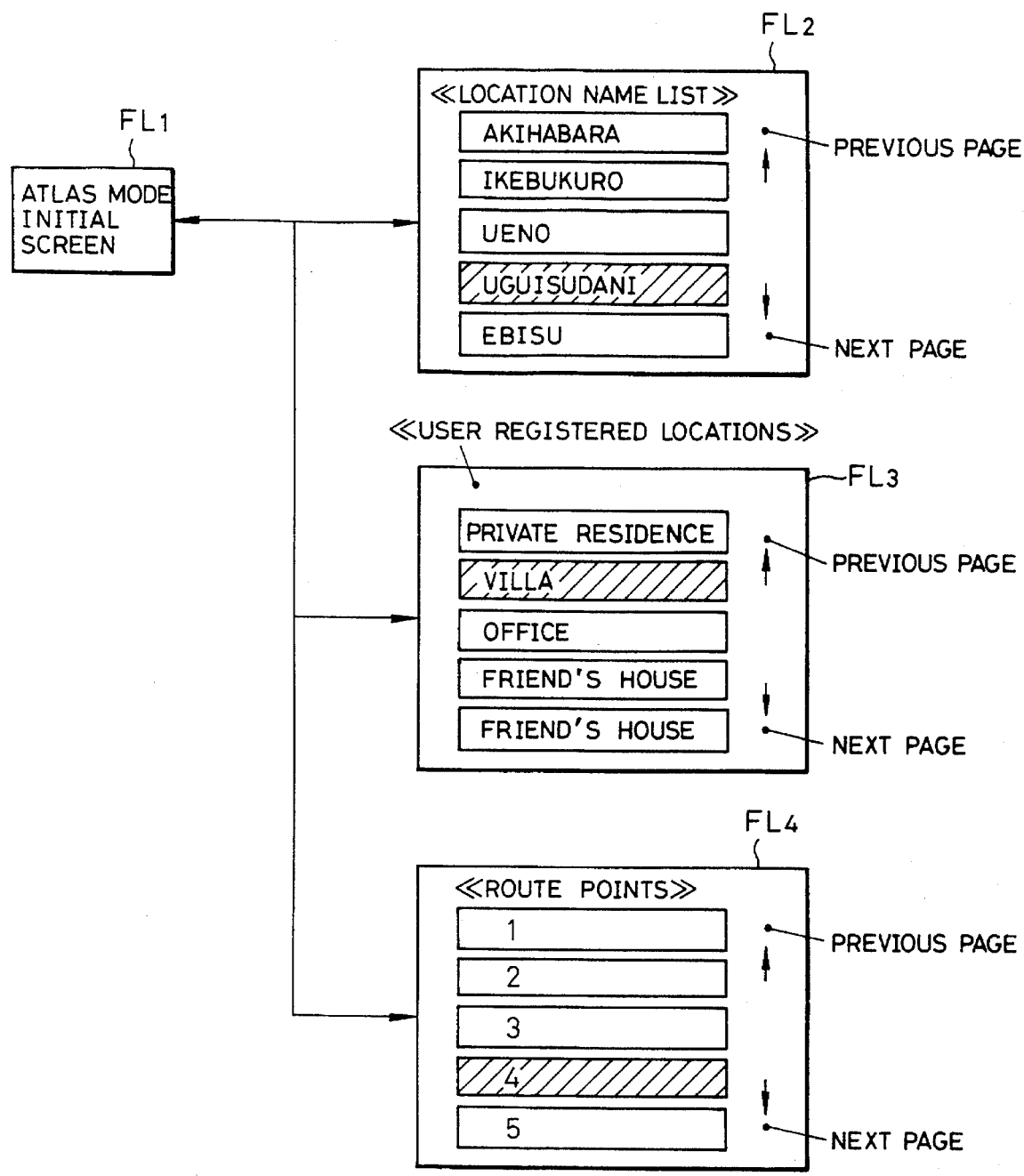
FIG. 6 is a diagram used for explaining the displaying operation in the atlas mode.
Figure 7:
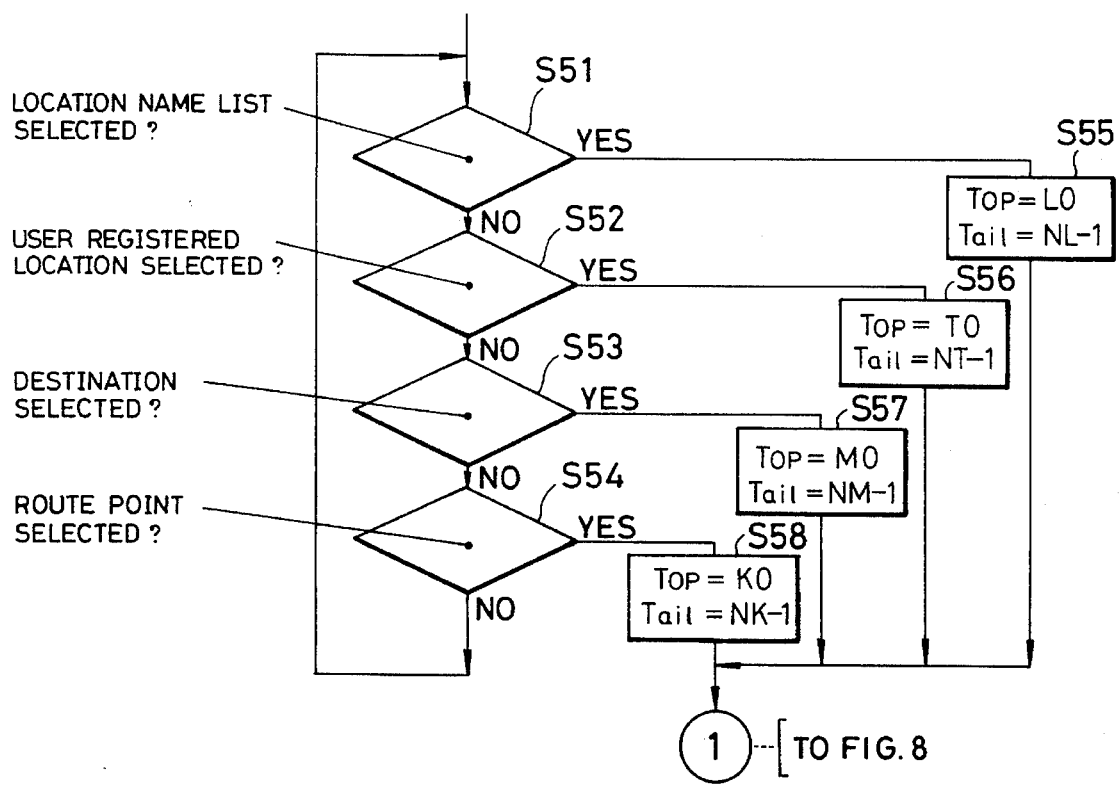
FIGS. 7 and 8 are flowcharts showing in detail the processing in a conventional atlas mode.
Figure 8:
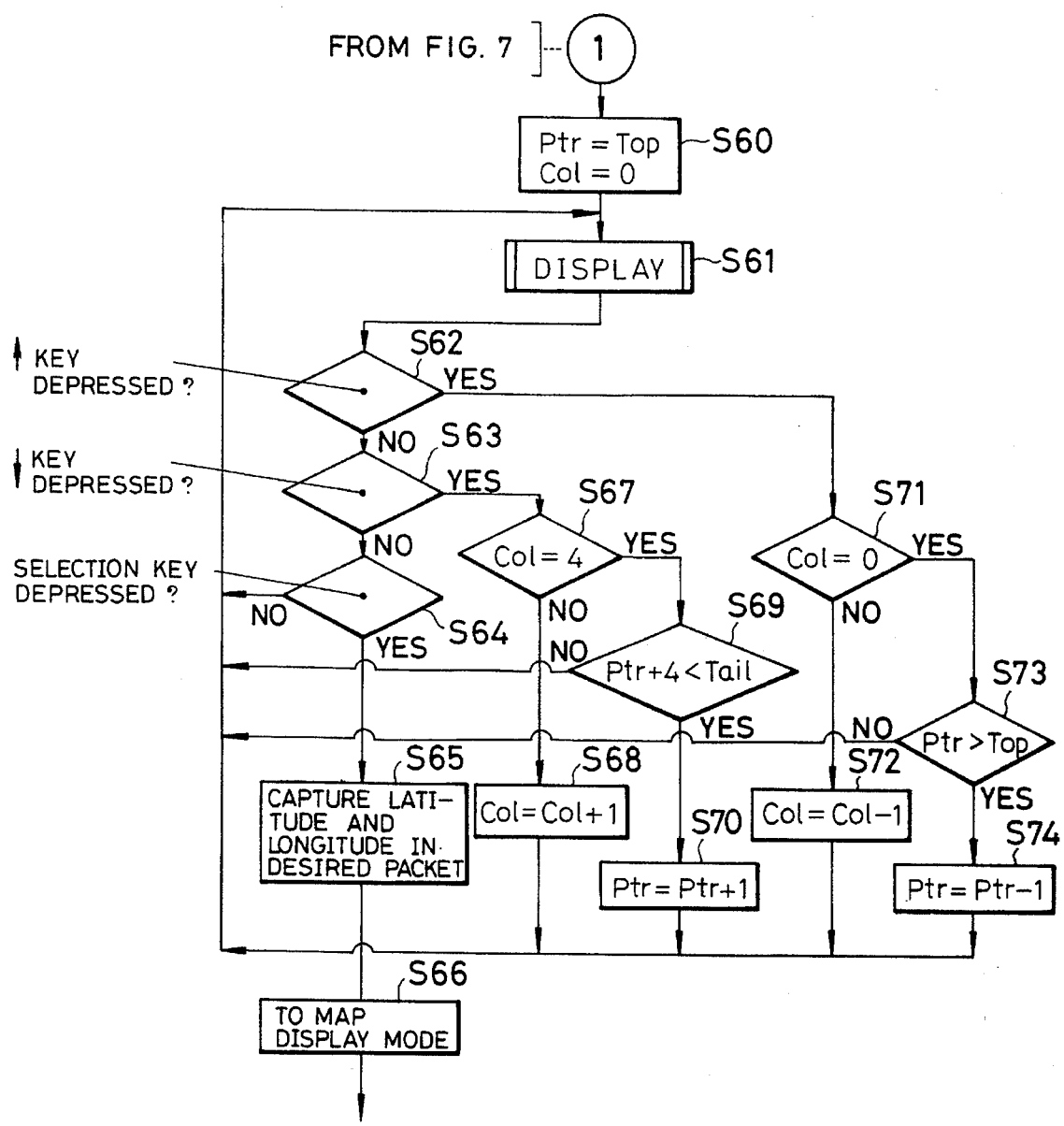

Next, other embodiments of the present invention will be explained in connection with the operations thereof with reference to FIGS. 4, 27 and 30.

Figure 1:
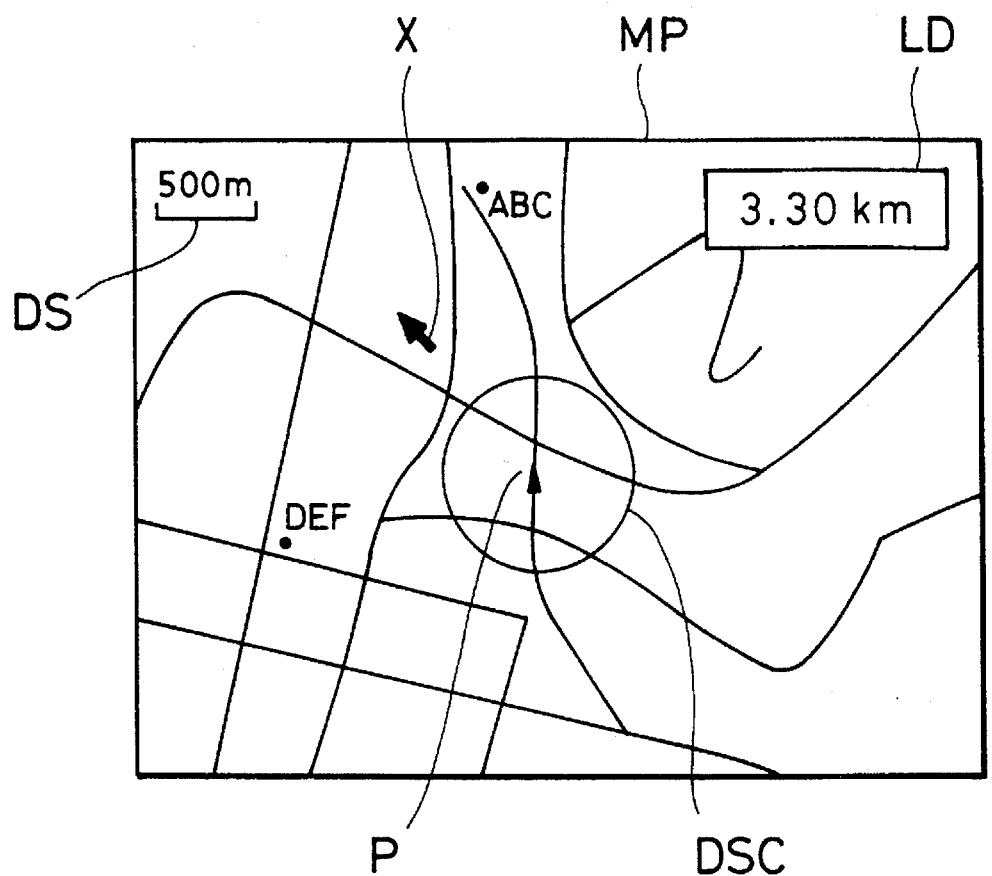
FIG. 1 is an explanatory diagram showing an example of a display screen of the prior art.
Figure 2:
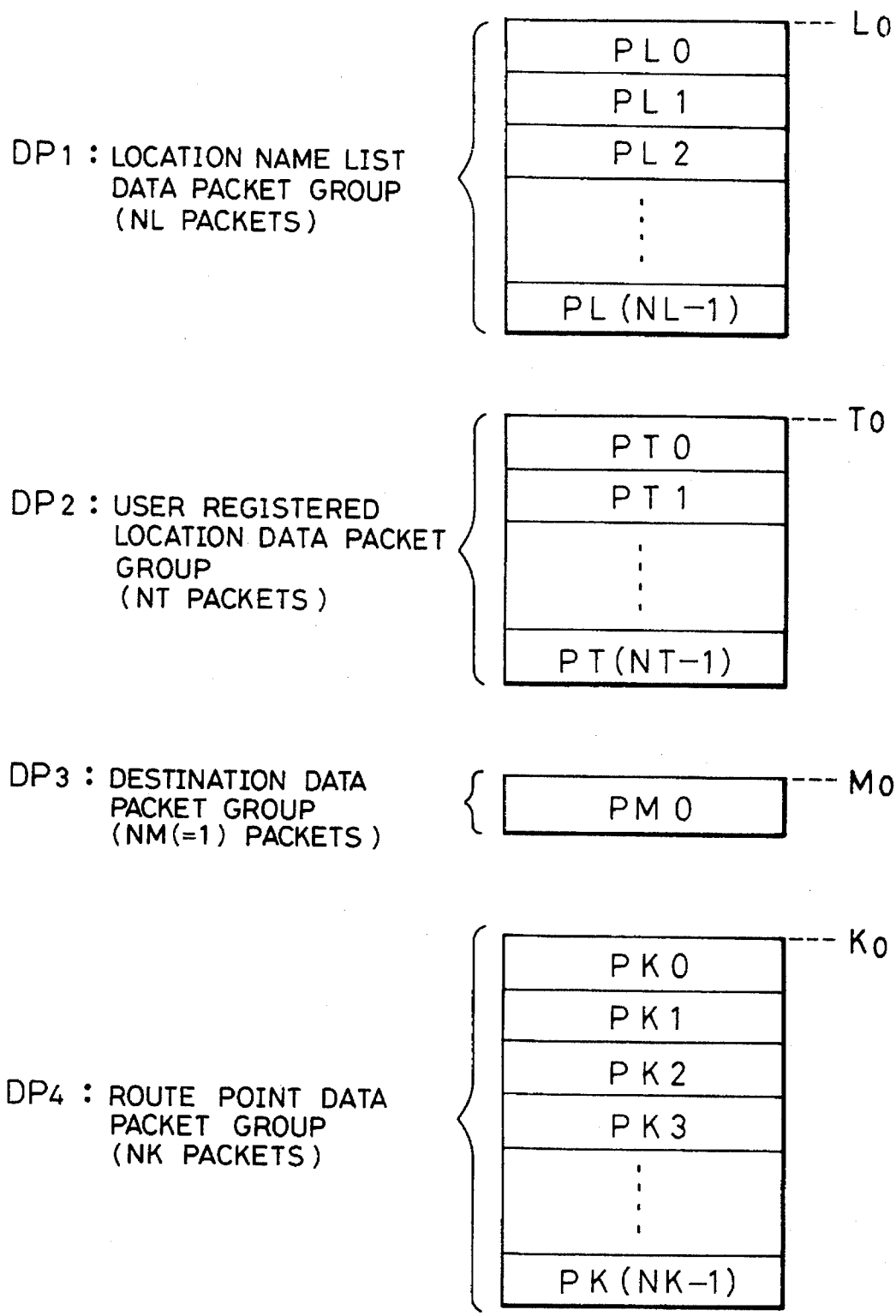
FIG. 2 is a diagram used for explaining a stored state of conventional packet data.
Figure 27:
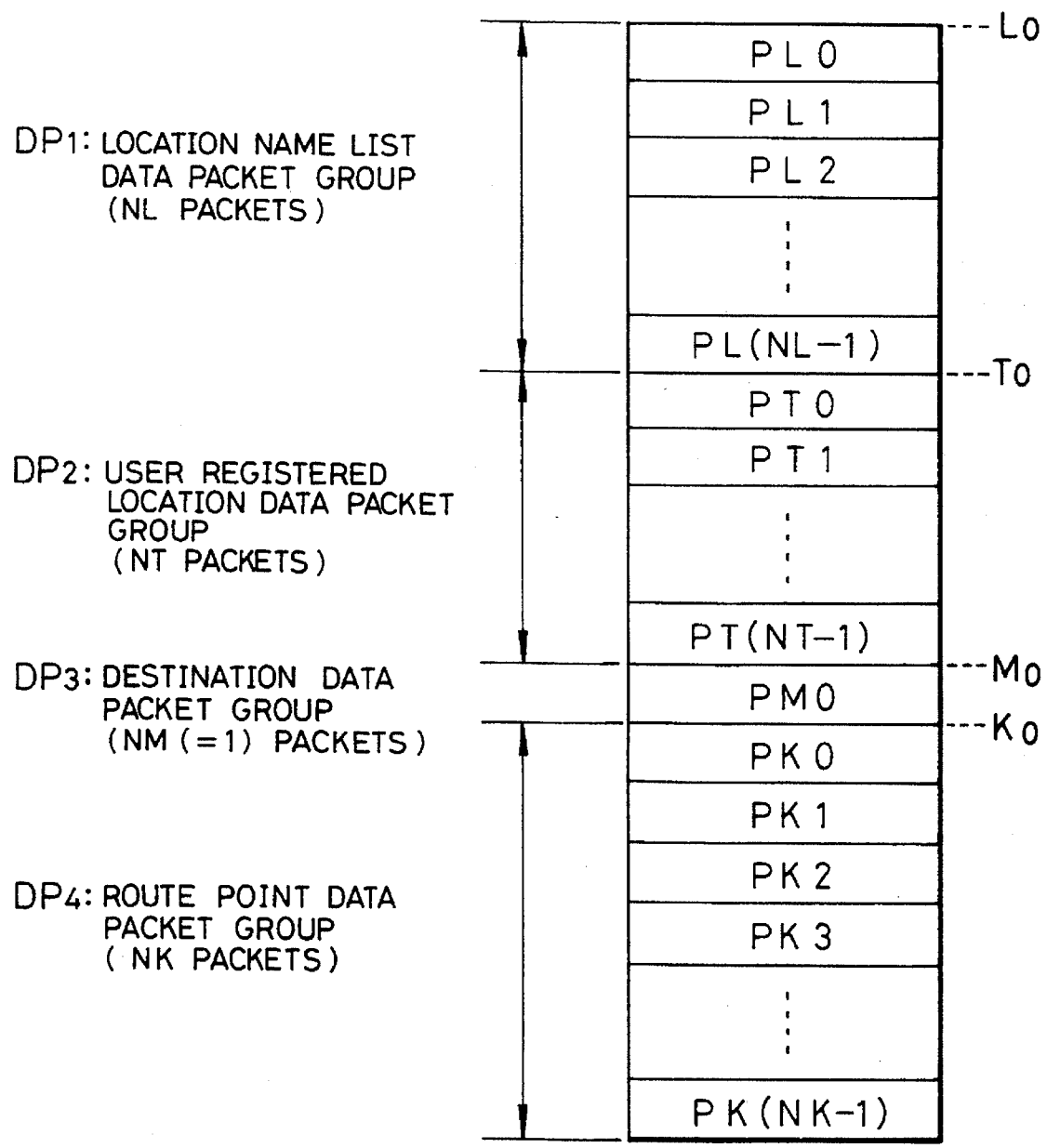
FIG. 27 is a diagram used for explaining a stored state of packet data.

FIG. 27 shows packet data groups in a stored state. The same parts in FIG. 27 as those in the prior art example of FIG. 2 are designated the same reference numerals. The stored state of the packet data groups of the present embodiments differs from that of the conventional packet data groups in that all of the packet data groups are stored in a sequential area in the present embodiment.

Figure 3A:
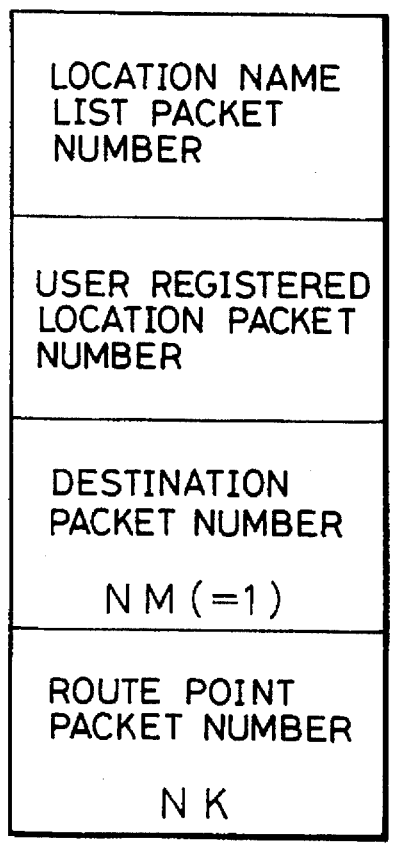
FIG. 3(*a*) and 3(*b*) are diagrams used for explaining a stored state of packet number data and the structure of each packet data, respectively.
Figure 3B:
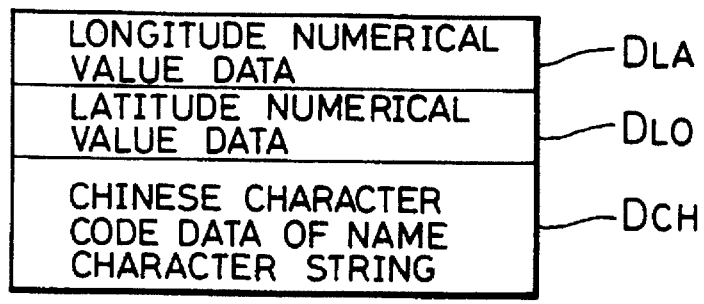

The respective packet data groups including location name data, user registered location data, destination data and route point data are sequentially stored from a predetermined storage start address L0. Numbers of packets constituting the respective packet data groups are stored in a predetermined storage area in a memory, not shown, as a destination name list packet number $N_L$, a user registered location packet number $N_T$, a destination packet number $N_M$ (=1), and a route point packet number $N_X$, as shown in FIG. 3(a). Each packet data constituting each packet data group comprises latitude numerical value data $D_{LA}$ indicative of the latitude of a concerned location, longitude numerical value data $D_{LO}$ indicative of the latitude of the concerned location, and chinese character code data $D_{CH}$ of a name character string corresponding to the name of the concerned location.

With the data structure as described above, a sequential suffix Si (i: an integer number not less than zero) is introduced in order to express sequential data storing addresses. Then, the following converting equations are used to enable these packet data groups $DP_1$–$DP_4$ to be treated as a single packet data group (data string):

$L_i = S_i$ $T_i = S(i+NL)$ $M_i = S(i+NL+NT)$ $K_i = S(i+NL+NT+NM)$ $S_i = L_i$ at condition: [i<NL]

$S_i = T_i$ at condition: [i<(NL+NT)]

$S_i = M_i$ at condition: [i<(NL+NT+NM)]

$S_i = K_i$ at condition: [i<(NL+NT+NM+NK)]

where a data storage start address Top=$L_0$; and a data storage end address Tail=$L_0$+NL+NT+NM+NK+1.

Since these converting equations allow plural categories of packet data groups to be processed as a single data group, display manipulation can be simplified.

Figure 28:
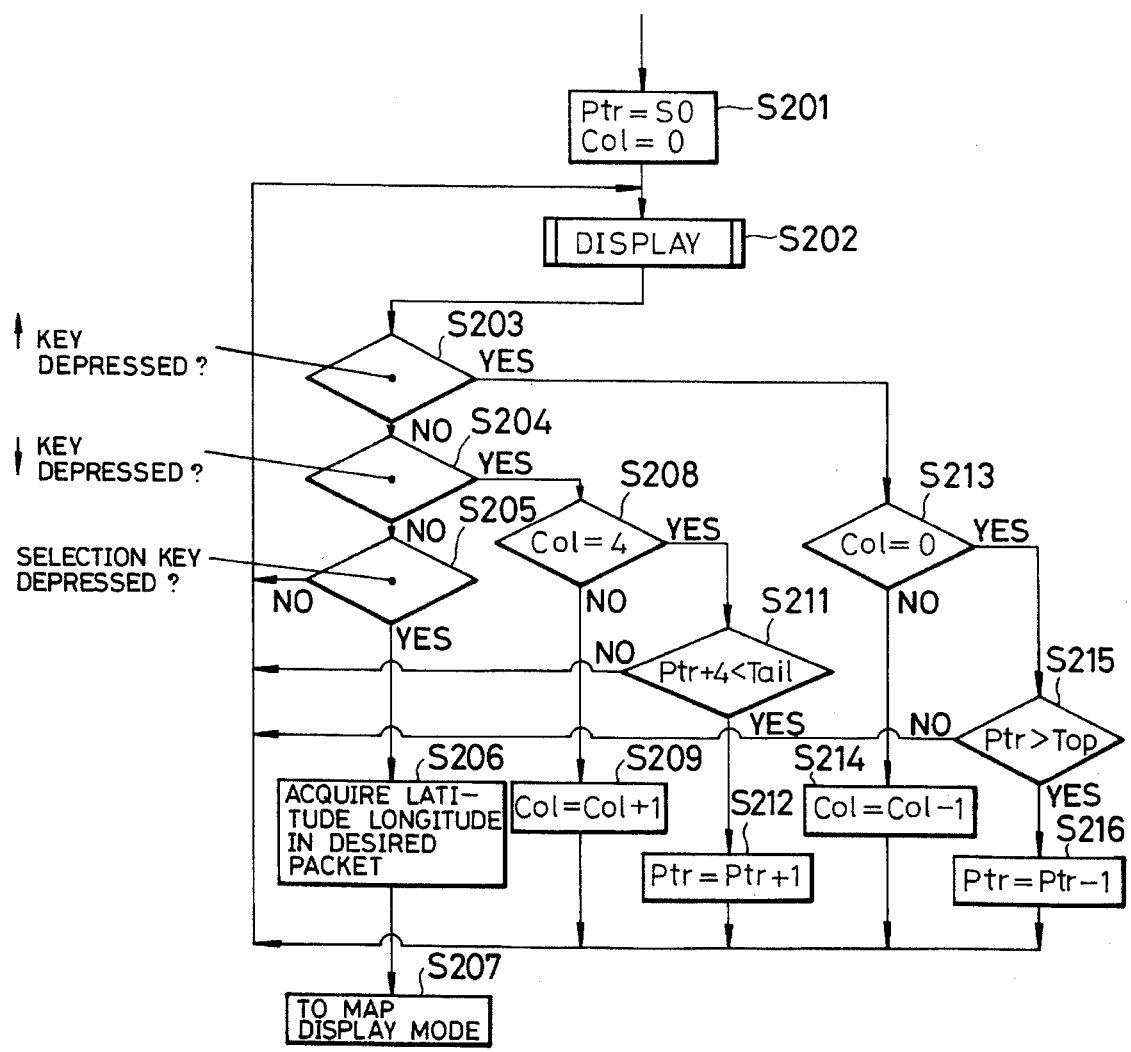
FIG. 28 shows a detailed processing flowchart according to a first embodiment.

FIG. 28 is a processing flowchart showing the operation of the present embodiment.

First, the start packet number Ptr is set to $S_0$ (=$L_0$), and a selected frame number Col is set to zero (step S201). In a subroutine DISPLAY (step S202), character strings indicative of the five packets beginning with a packet, the storage start address of which is set in the start packet number Ptr, are sequentially displayed from the upper side as items to be selected, determination is made to which item from the top the color of the frame is to be changed, and the color within the frame corresponding to the selected item is changed.

Next, if it is determined, at step S203, that an upward moving key (↑) has been depressed, the flow proceeds to step S213, where it is determined whether or not the selected frame number Col is equal to zero (Col=0). If the selected frame number Col is not equal to zero (Col≠0), Col is decremented by one at step S214 (Col=Col−1), and thereafter the flow returns to step S202.

If the selected frame number Col is equal to zero (Col=0), it is determined whether or not the start packet number Ptr is larger than the data storage start address Top (step S215). If Ptr>Top, Ptr is decremented by one at step S216 (Ptr=Ptr−1), and thereafter the flow returns to step S202. Conversely, if Ptr≦Top, the flow immediately jumps to step S202.

Turning back to step S203, if the upward moving key is depressed, the flow proceeds to step S204 to determine whether or not a downward moving key (↓) has been depressed. If the downward moving key (↓) has been depressed, the flow proceeds to step S208. At step S208, it is determined whether or not the selected frame number is equal to four (Col=4). If the selected frame number Col is not zero (Col≠0), Col is incremented by one (Col=Col+1) at step S209, and then the flow again returns to step S202.

If the selected frame number Col is equal to four (Col=4), it is determined at step S211 whether or not the start packet number Ptr plus four is larger than the data storage end address Tail (Ptr+4>Tail). If Ptr+4<Tail, Ptr is incremented by one (Ptr=Ptr+1) at step S212, and thereafter the flow returns to step S202. Conversely, if Ptr+4≧Tail, the flow immediately returns to step S202.

If neither the upward moving key (↑) nor the downward moving key (↓) has been depressed but any other key has been depressed instead, the flow immediately returns to step S202 by the determination of step S205.

If the determination at step S205 shows that a selection key has been depressed, latitude data and longitude data are acquired at step S206 from packet data, the packet number of which is expressed by the start packet number Ptr plus the selected frame number Col (Ptr+Col), and a map around the location corresponding to the acquired latitude data and longitude data is displayed at step S207.

Figure 29:
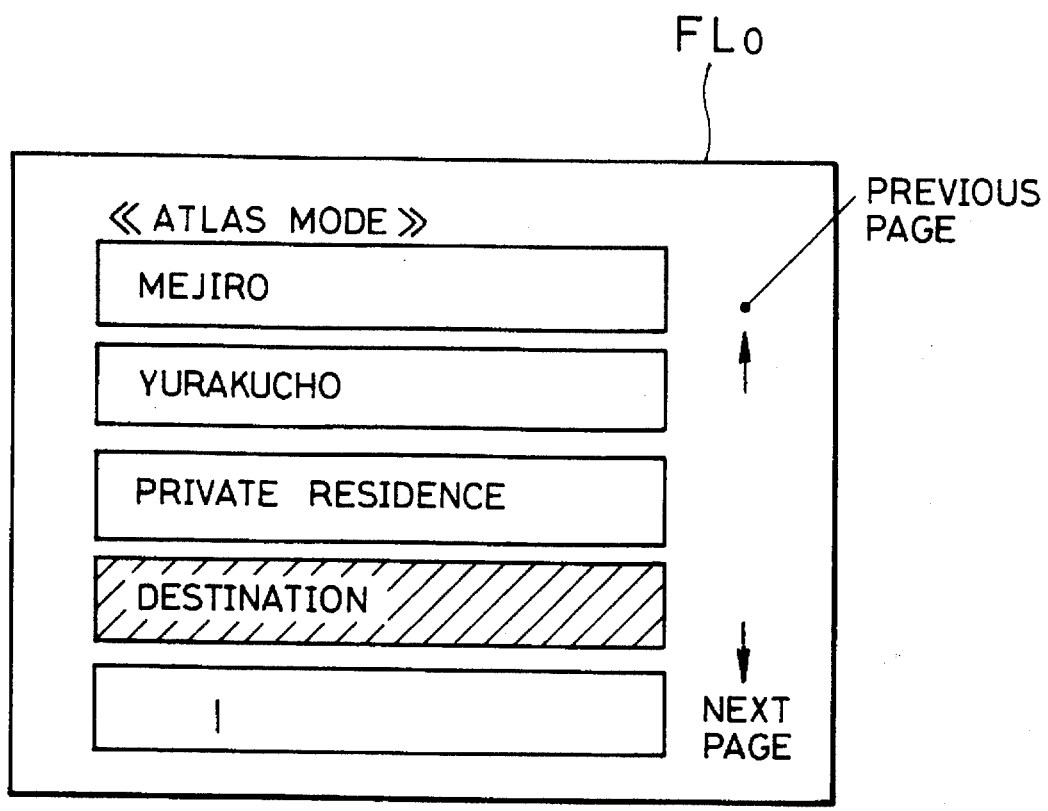
FIG. 29 is a diagram used for explaining a screen for selecting a location name in the first embodiment.

By thus designing the processing sequences, when the user selects the atlas mode, a location name selecting screen $FL_0$ shown in FIG. 29 is immediately displayed, wherein location names in the location name list data, the user registered location data, the destination data and the midway-point data are all displayed in sequence merely by manipulating the upward and downward cursor moving keys (↑, ↓), thereby allowing the user to readily select a desired location. Referring more specifically to FIG. 29, all the different categories of the location name data (Mejiro, Yurakucho), the user registered location data (private residence), the destination data (destination), and the route point data (1) are all displayed on a single screen.

A further embodiment of the present invention will next be described with reference to FIG. 30.

The above embodiment displays all packet data without any condition, whereas, the present embodiment sets certain conditions so as to display from all packet data those which meet such conditions.

For example, assume a navigation system equipped in a helicopter for use in the press. Such a helicopter, when collecting information at an accident spot (assuming that the latitude and longitude of the location are known), may go there from the heliport nearest from the accident spot from among previously registered public heliports (=location name list data) and a heliport owned by the information medium or a contracted heliport (user registered location data). In such a case, it is necessary to select the heliport nearest from the accident spot irrespective of whether the nearest heliport belongs to the location name list data or user registered location data. It is also preferable in such a case to calculate straight distances from the current vehicle's position to all locations registered in the packet data and sequentially display the locations from the one with the shortest distance on a location name selecting screen.

Figure 30:
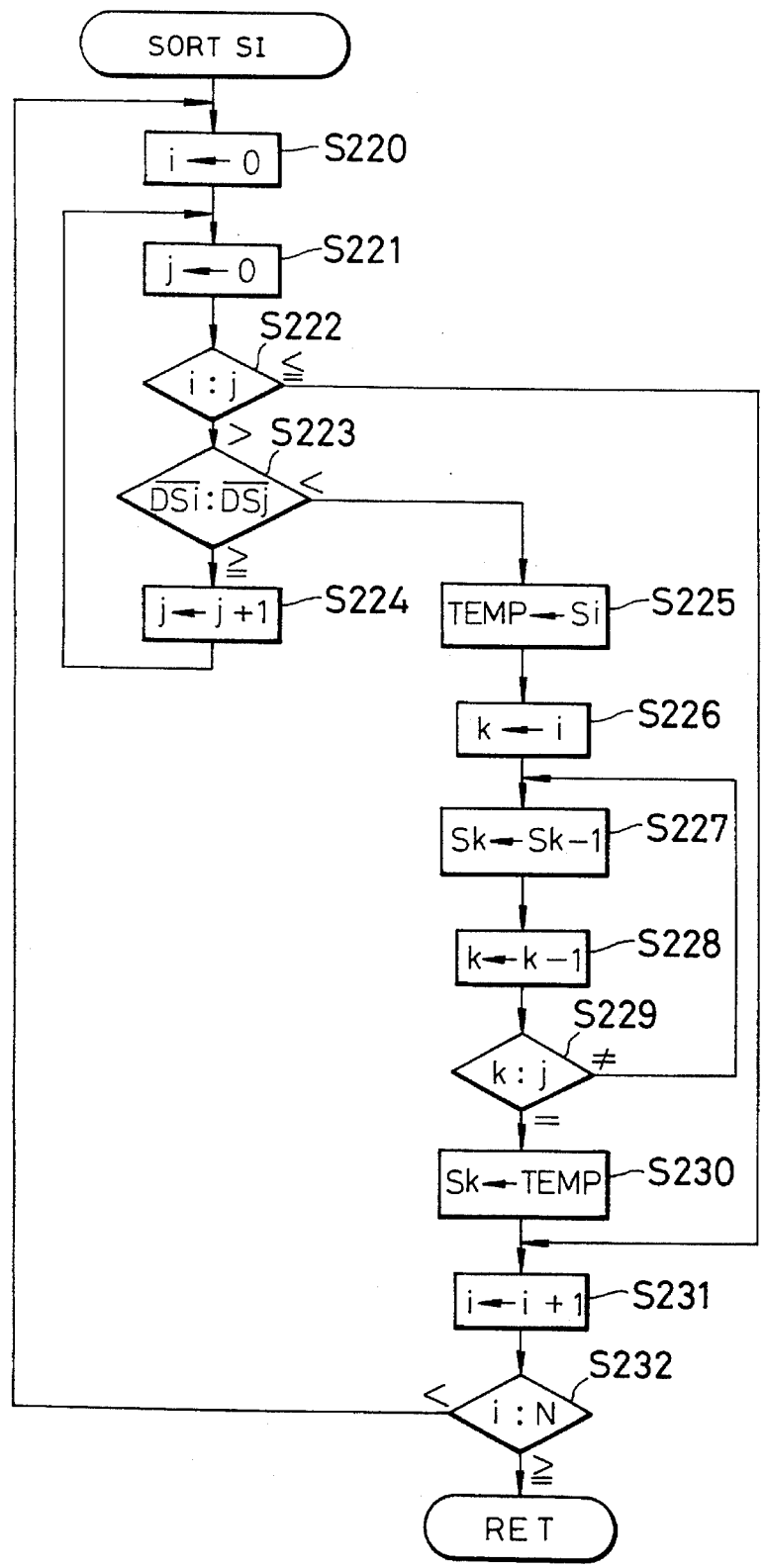
FIG. 30 is a detailed processing flowchart according to a second embodiment.

FIG. 30 shows a processing flowchart of a data sort operation in the present embodiment.

First, i is set to zero as an initial setting (i=0) (step S220). Then, j is set to zero (j=0) (step S221), and i is compared with j (step S222). If i≦j, the flow proceeds to step S231.

Conversely, if i>j, the straight distance DS is between an accident spot and a location corresponding to Si is compared with the straight distance DSj between the accident spot and a location corresponding to Sj (step S223). If DSi≧DSj, j is incremented by one (j=j+1) (step 224), and then the flow returns to step 221. Thereafter, the processing from step S221 to step S224 is repeated.

If DSj>DSi at step S223, packet data corresponding to Si is temporarily saved in a working area TEMP, and i is substituted for a replacing variable k (step S226). Then, Sk is decremented by one (Sk=Sk−1) (step S227). In other words, Si is updated with Si−1.

In continuation, K=1 is substituted for the replacing variable k (step S228), and the replacing variable k is compared with j (step S229). If k≠j, the flow returns to step S227 to repeat the processing from step S227 to step S229. If k=j, packet data corresponding to Sk is updated with the packet data temporarily saved in the working area TEMP (step S230).

Next, i is incremented by one (i=i+1) (step S231), and i is compared with N (=NL+NT+NM+NK, see the first embodiment) (step S232). If i≧N, the processing is terminated. Conversely, if i<N, the flow returns to step S220, and thereafter the processing from step S220 to S232 is repeated.

The above processing allows heliport data to be orderly rearranged from the heliport nearest from the accident spot to other heliports located gradually remoter from the accident spot.

Thus, the heliport nearest from the accident spot is first displayed on the screen and other heliports remoter therefrom are subsequently displayed in sequence, thereby allowing the user to readily select a target heliport.

Although in the above described embodiment, heliports with shorter distances from the accident spot are displayed with priority, the determination at step S223 may be changed to only display heliports which are located within a predetermined distance from the accident spot or display those which meet a variety of conditions set for extraction, thereby facilitating the selection of the user.

According to a third feature of the present invention, the second storage means classifies location name data of a plurality of locations and coordinate data corresponding thereto according to the category of the locations and stores therein the classified data. The location name display means sequentially displays the location names classified into a plurality of categories on the display means. When the user selects a desired location from the location names displayed on the display means by way of the selecting means, the map display control means reads data on a map around a location associated with the coordinate data corresponding to the location name selected by the selecting means, and the map is displayed on the basis of the map data, whereby the user can have a map around a desired location display on the screen by a simple manipulation of merely selecting the desired location from sequentially displayed location names in a plurality of categories, thus facilitating map display manipulation.

What is claimed is:

1. A navigation system comprising:
   a position detector which detects a vehicle position and outputs vehicle position data;
   a storage device which stores map data;
   a display;
   a display controller which displays a map on said display based on said map data and superimposes the vehicle position on said map displayed on said display based on said vehicle position data;
   a position selector which enables a user to select an arbitrary position on said map displayed on said display;
   a coordinate calculator which calculates latitude and longitude values as coordinates of an actual location corresponding to said selected position on said map and outputs said values as coordinate data; and
   a coordinate display controller which displays said coordinates of said actual location in numerical values in an area superimposed on said map being displayed by said display controller, based on said coordinate data calculated by said coordinate calculator.

2. An apparatus as claimed in claim 1, wherein said arbitrary position is different from said vehicle position when selected.

* * * * *